(12) United States Patent
Saylor et al.

(10) Patent No.: US 9,450,958 B1
(45) Date of Patent: Sep. 20, 2016

(54) PERMISSION DELEGATION TECHNOLOGY

(71) Applicant: MicroStrategy Incorporated, Vienna, VA (US)

(72) Inventors: Michael J. Saylor, Vienna, VA (US); Hector Vazquez, Ashburn, VA (US); Andrew T. Foy, Arlington, VA (US)

(73) Assignee: MicroStrategy Incorporated, Vienna, VA (US)

( * ) Notice: Subject to any disclaimer, the term of this patent is extended or adjusted under 35 U.S.C. 154(b) by 121 days.

(21) Appl. No.: 14/208,150

(22) Filed: Mar. 13, 2014

Related U.S. Application Data

(60) Provisional application No. 61/791,040, filed on Mar. 15, 2013.

(51) Int. Cl.
*H04L 29/06* (2006.01)

(52) U.S. Cl.
CPC .................. *H04L 63/0884* (2013.01)

(58) Field of Classification Search
CPC ............... H04L 63/0884; H04L 67/10
See application file for complete search history.

(56) References Cited

U.S. PATENT DOCUMENTS

| | | | |
|---|---|---|---|
| 8,234,220 B2 | 7/2012 | Weiss | |
| 8,433,656 B1 * | 4/2013 | Evans | G06F 21/629 463/29 |
| 8,613,052 B2 | 12/2013 | Weiss | |
| 9,098,675 B1 * | 8/2015 | Roth | G06F 21/00 |
| 2012/0180123 A1 * | 7/2012 | Kuenzi | G06F 21/34 726/20 |
| 2013/0086693 A1 * | 4/2013 | Laverdiere-Papineau | G06F 21/6218 726/28 |
| 2013/0174223 A1 * | 7/2013 | Dykeman | G06F 21/10 726/4 |

OTHER PUBLICATIONS

Wikipedia, "Certificate authority," Wikipedia [online] Aug. 8, 2012 [retrieved on Aug. 15, 2012]. Retrieved from the Internet: <URL: http://en.wikipedia.org/wiki/Certificate_authority>, 4 pages.

Wikipedia, "Certificate signing request," Wikipedia [online] Aug. 20, 2013 [retrieved on Aug. 24, 2012]. Retrieved from the Internet: <URL: http://en.wikipedia.org/wiki/Certificate_signing_request>, 4 pages.

(Continued)

*Primary Examiner* — Chau Le
*Assistant Examiner* — Ghodrat Jamshidi
(74) *Attorney, Agent, or Firm* — Fish & Richardson P.C.

(57) ABSTRACT

In one implementation, a computer system maintains one or more permissions associated with a credential held by a first user, where at least one of the one or more of permissions is delegatable by the first user to one or more other users. The computer system receives an indication that the first user has chosen to delegate a particular permission from amongst the one or more permissions to a second user, wherein the particular permission is needed to perform a particular type of action. Based on the first user indicating a choice to delegate the particular permission to the second user, the computer system associates the delegation of the particular permission with the second user. Based on delegating the particular permission with the second user, the computer system enables the second user to perform the particular type of action.

19 Claims, 11 Drawing Sheets

(56) References Cited

OTHER PUBLICATIONS

Wikipedia, "Cryptographic hash function," Wikipedia [online] Aug. 8, 2012 [retrieved on Aug. 15, 2012]. Retrieved from the Internet: <URL: http://en.wikipedia.org/wiki/Cryptographic_hash_function>, 5 pages.

Wikipedia, "Digital signature," Wikipedia [online] Aug. 14, 2012 [retrieved on Aug. 15, 2012]. Retrieved from the Internet: <URL: http://en.wikipedia.org/wiki/Digital_signature>, 10 pages.

Wikipedia, "ID-based encryption," Wikipedia [online] Jul. 27, 2012 [retrieved on Aug. 15, 2012]. Retrieved from the Internet: <URL: http://en.wikipedia.org/wiki/Identity_based_encryption>, 5 pages.

Wikipedia, "Message authentication code," Wikipedia [online] Aug. 8, 2012 [retrieved on Aug. 15, 2012]. Retrieved from the Internet: <URL: http://en.wikipedia.org/wiki/Message_authentication_codes>, 4 pages.

Wikipedia, "Multi-factor authentication," Wikipedia [online] Aug. 6, 2012 [retrieved on Aug. 15, 2012]. Retrieved from the Internet: <URL: http://en.wikipedia.org/wiki/Multi-factor_authentication>, 3 pages.

Wikipedia, "Public key certificate," Wikipedia [online] Aug. 12, 2012 [retrieved on Aug. 15, 2012]. Retrieved from the Internet: <URL: http://en.wikipedia.org/wiki/Digital_certificates>, 7 pages.

Wikipedia, "Public-key cryptography," Wikipedia [online] Aug. 15, 2012 [retrieved on Aug. 15, 2012]. Retrieved from the Internet: <URL: http://en.wikipedia.org/wiki/Public-key_cryptography>, 12 pages.

Wikipedia, "Public-key infrastructure," Wikipedia [online] Aug. 8, 2012 [retrieved on Aug. 15, 2012]. Retrieved from the Internet: <URL: http://en.wikipedia.org/wiki/Public_Key_Infrastructure>, 6 pages.

Wikipedia, "SecureID," Wikipedia [online] Jul. 5, 2012 [retrieved on Aug. 15, 2012]. Retrieved from the Internet: <URL: http://en.wikipedia.org/wiki/SecurID>, 5 pages.

Wikipedia, "Two-factor authentication," Wikipedia [online] Aug. 13, 2012 [retrieved on May 15, 2012]. Retrieved from the Internet: <URL: http://en.wikipedia.org/wiki/Two-factor_authentication>, 15 pages.

\* cited by examiner

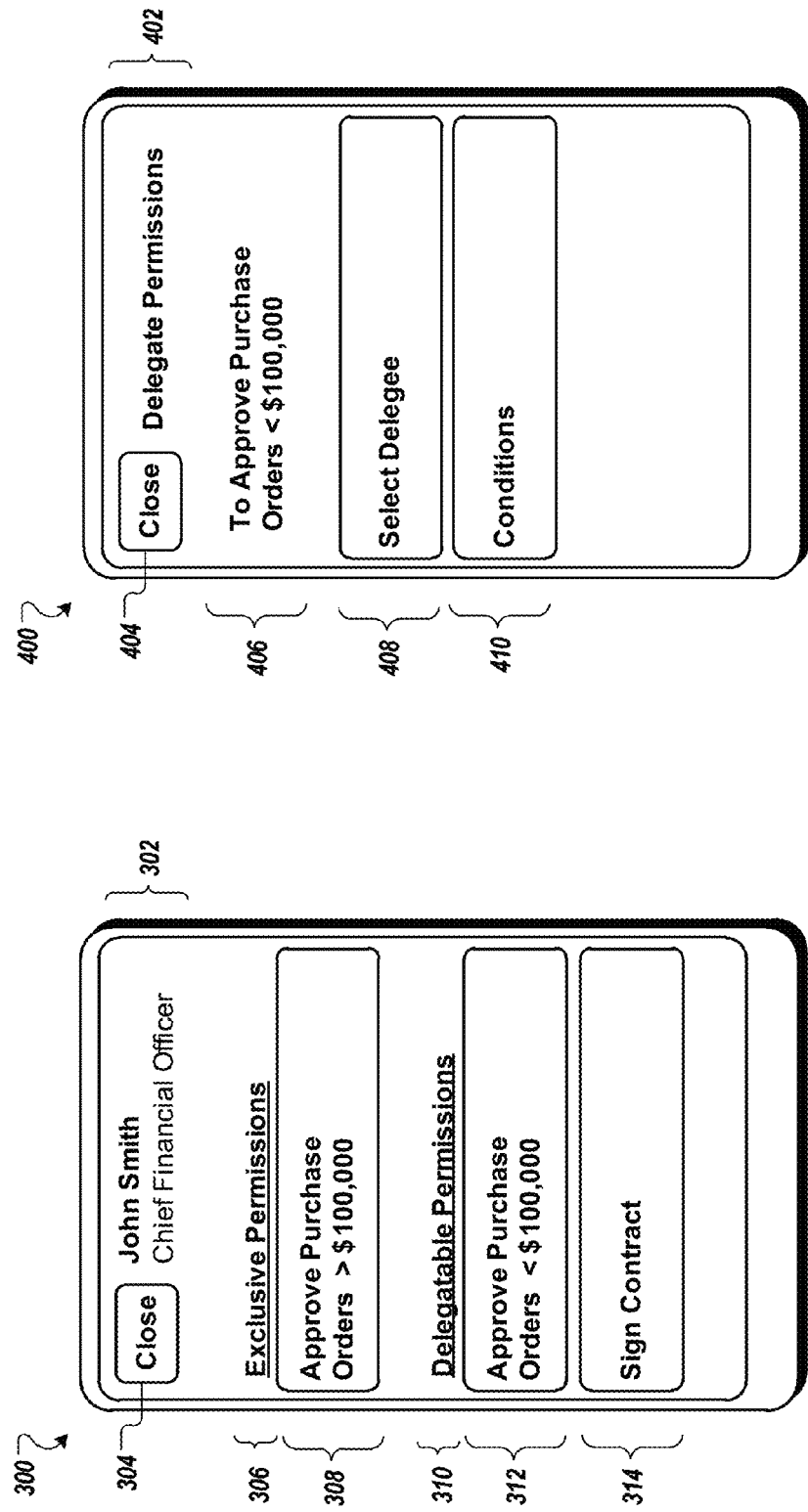

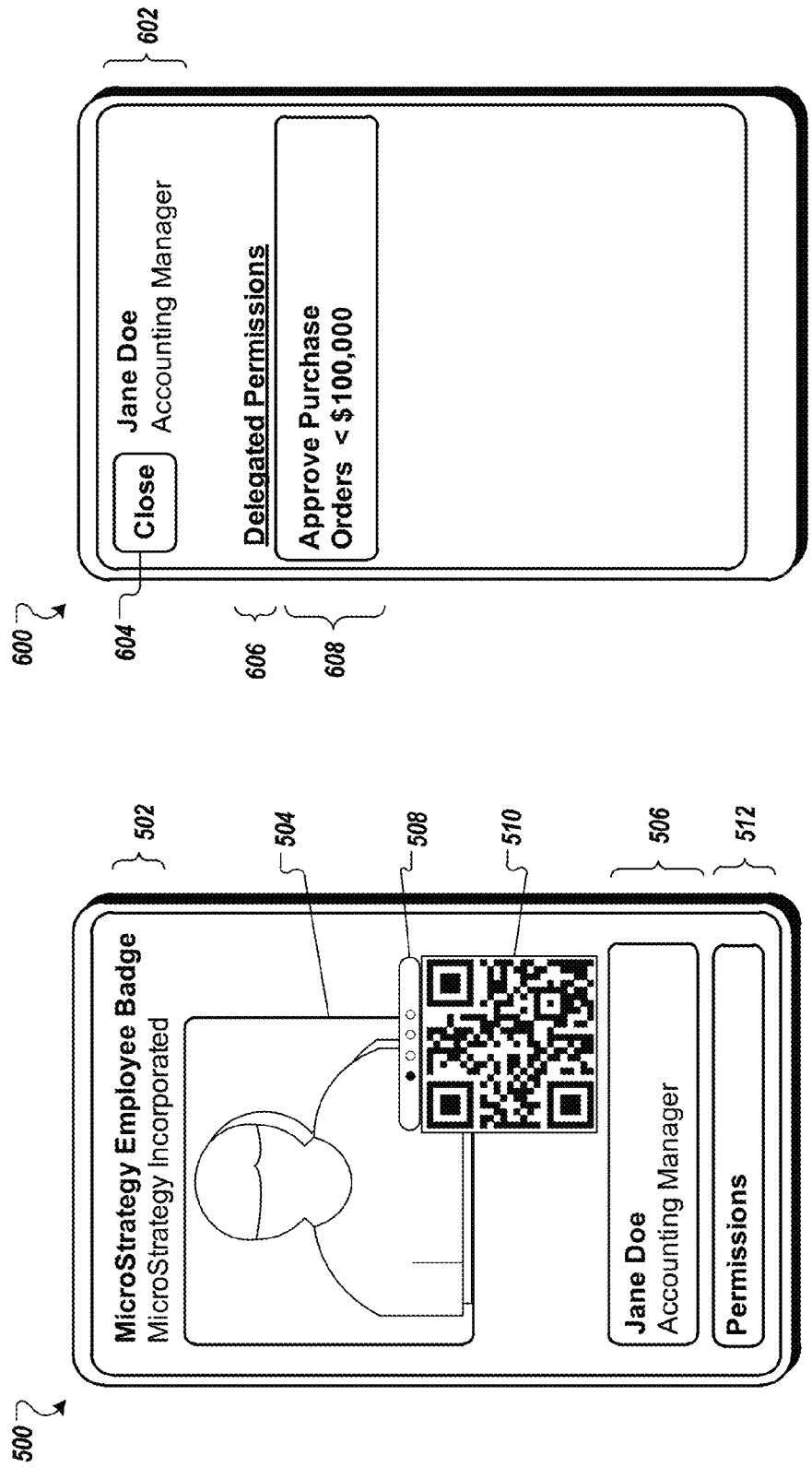

| User Permission | Delegated Permission | Location Conditions | Time Conditions | Delegatable Permission | Permission Delegated To | Delegated Location Conditions | Delegated Time Conditions |
|---|---|---|---|---|---|---|---|
| Approve Purchases >$100,000 | No | < 30 Miles Tyson's Corner | Monday–Friday 9:00AM–5:00PM | No | N/A | N/A | N/A |
| Approve Purchases <$100,000 | No | < 30 Miles Tyson's Corner | Monday–Friday 9:00AM–5:00PM | Yes | Accounting Mgr "Jane Doe" | < 30 Miles Tyson's Corner | Monday–Friday 5:00PM–7:00PM |
| Sign Contract | Yes | < 30 Miles Tyson's Corner | Before Jan 1, 2013 at 5:00 PM | No | N/A | N/A | N/A |

FIG. 12

PERMISSION DELEGATION TECHNOLOGY

CROSS-REFERENCE TO RELATED APPLICATION

This application claims priority from U.S. Provisional Application No. 61/791,040, filed Mar. 15, 2013, and titled "Permission Delegation," which is incorporated by reference.

TECHNICAL FIELD

This disclosure relates to delegating permissions associated with credentials.

BACKGROUND

A user may be associated with a credential that confers permissions enabling the user to perform particular actions, for example, enabling the user to authorize or access particular actions, events, or locations.

DESCRIPTION OF DRAWINGS

FIG. 3 is an illustration of an example of a menu that enables a user to select from among various permissions associated with a credential;

FIGS. 4A and 4B are illustrations of example interfaces that enable a user to delegate permissions associated with a credential;

FIG. 5 is an illustration of an example of a representation of a credential;

FIG. 6 is an illustration of an example of a menu that enables a user to select from among various permissions associated with a credential;

FIG. 12 is a representation of an example implementation of a data structure for storing and maintaining permissions associated with a credential.

DETAILED DESCRIPTION

Figures 1, 2:
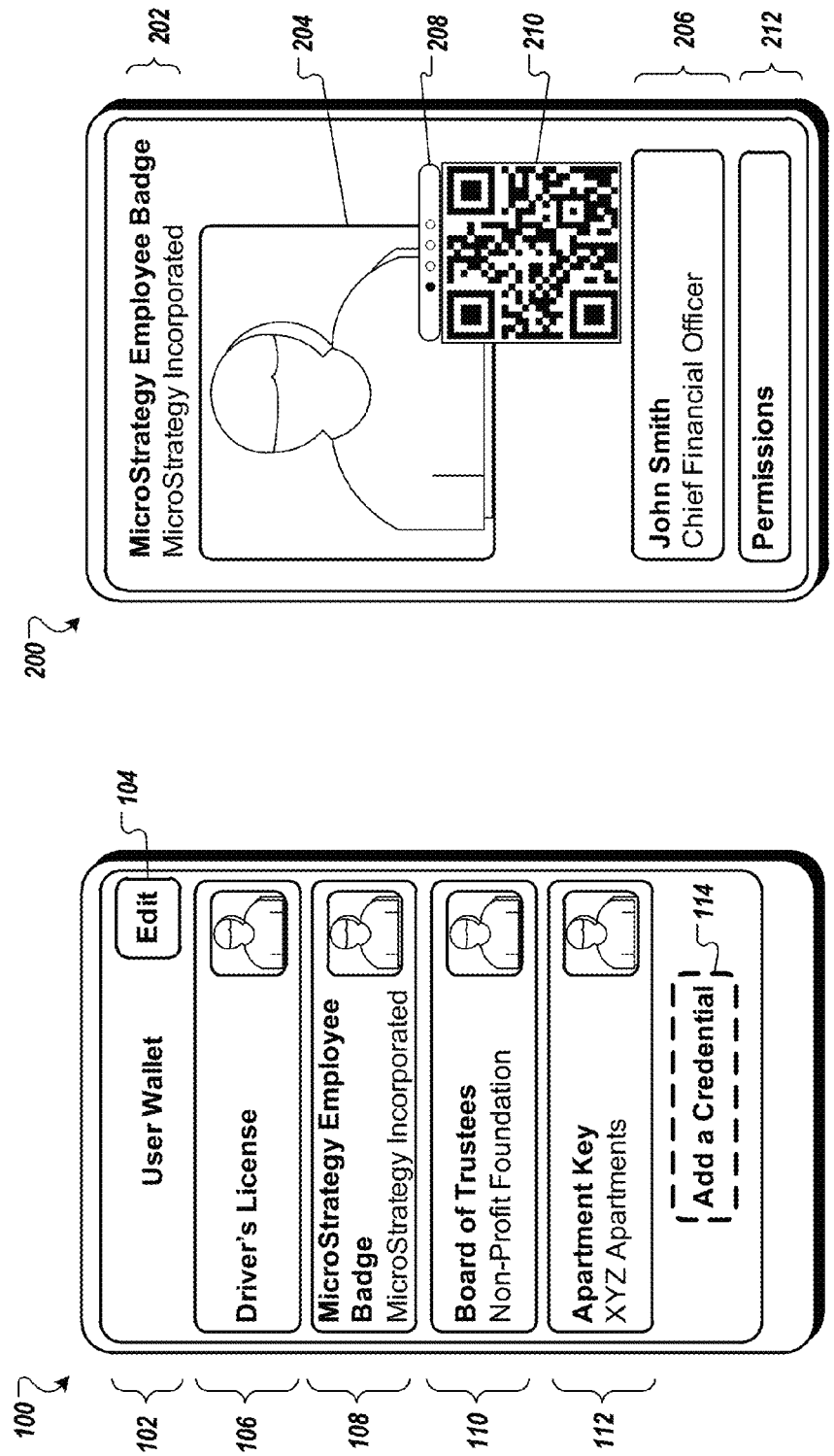
FIG. 1 is an illustration of an example of a user interface that enables a user to select from among various credentials.
FIG. 2 is an illustration of an example of a representation of a credential.

A credential associated with a user may confer one or more permissions that enable the user to perform actions associated with those permissions. For example, a credential granted to a user may confer permissions to the user that enable the user to authorize transactions or events, enter specific locations, access electronic information, and/or perform any type of action regulated by a permission system. In some instances, credentials may be accessed and rendered at a client device associated with a user, such as a smartphone or other mobile device, enabling the user to remotely access and utilize permissions associated with a credential. The one or more permissions conferred by a credential may be delegatable permissions. In such instances, a first user who holds a credential that confers a delegatable permission may request to delegate the permission to another, second user, for example, by associating the permission with a credential held by the second user.

Techniques are described for delegating permissions associated with a first credential held by a first user to a second credential held by a second user. In some implementations, credentials may be maintained and stored on a server, and a user with a user account may have one or more credentials associated with that user account. A user may select a particular delegatable permission associated with one of those credentials and may delegate the permission to another user. In some instances, delegating the permission to another user may involve adding the permission to a credential already associated with the other user. This may be achieved, for example, by accessing the credential on the server and modifying the credential to include the delegated permission. Alternatively, in other instances, delegating the permission to another user may involve creating a new, and perhaps temporary, credential for the other user and adding the permission to the new credential.

In some implementations, user credentials may be configured such that permissions associated with the user credentials may have one or more conditions associated with the permission, such as, for example, one or more geographic or temporal conditions. In delegating a permission to a second user, a first user may apply one or more conditions to the delegated permission in such a manner that the recipient of the delegated permission may only utilize the delegated permission when the applied conditions are satisfied. A user may present a credential conferring a permission to perform an action in connection with an attempt to perform the action associated with the permission, where presenting the credential may involve providing a representation of the credential for validation to demonstrate the user's permission to perform the action. In some instances, a representation of a credential may include a quick response (QR) code, a barcode, an alphanumeric code, or a code encoded in a signal, such as within a sound signal, a near field communication (NFC) signal, and/or other short-wavelength radio transmissions (e.g., in the ISM band from 2400-2480 MHz), for example, according to the Bluetooth standard.

FIG. 1 shows an example user interface 100 that enables a user to select from among various credentials belonging to the user. For example, the user interface 100 may be displayed on a user's client device and includes a user's wallet, identified by a "User Wallet" caption 102, that provides the user with access to various different credentials associated with the user. The credentials may be credentials that a user has been granted by one or more credential granting authorities. As illustrated in FIG. 1, the user interface 100 includes a "Driver's License" 106, a "MicroStrategy Employee Badge" 108, a "Board of Trustees" credential 110, and an "Apartment Key" 112. The user may select any one of these credentials from the user interface 100 to output a representation of the credential at the user's client device. The user can make the selection, for example, by touching the corresponding area on a presence-sensitive display of the client device, or by another selection method. An "Edit" 104 option is also displayed within user interface 100 that allows a user to access and modify settings associated with the credentials, or to manage the credentials. The user can also add a new credential by selecting an "Add a Credential" option 114 displayed within user interface 100. The credentials 106-112 displayed on the user interface 100 may be made available to a client device associated with a user through a central hub or server that manages credentials. The credentials may be granted by various different credential granting organizations that are all associated with the central hub or server, and may be made available to the user's device by accessing the central hub or server, for example, in response to selecting the "Add a Credential" option 114 within the user interface 100.

FIG. 2 illustrates an example representation of a credential. For instance, when a user selects the "MicroStrategy Employee Badge" 108 option shown in FIG. 1 the selected badge 200 may be displayed on the client device as illustrated in FIG. 2. The selected badge 200 may include a caption 202 identifying the badge. For example, as shown, the caption 202 states that the badge is a "MicroStrategy Employee Badge" associated with "MicroStrategy Incorporated." The badge 200 may also include an image 204 of the user and a second caption 206 identifying the user. For example, the user may be identified in caption 206 as "John Smith" and the caption may further include the position of the user associated with the badge, in this instance "Chief Financial Officer." The information displayed in badge 200 may be information that has been provided to the central hub or server by a credential issuing organization in conjunction with issuing the credential to the user. For example, "MicroStrategy Incorporated" may have provided the information to the central hub or server when issuing the credential to "John Smith." The badge 200 may further include a swiping slider 208 that enables the user to output at the client device different validation mechanisms of the credential. For example, in the current position, the swiping slider 208 causes an optical-machine readable validation mechanism for the credential 210, such as a quick response (QR) code, to be displayed at the client device. Badge 200 may further include an option to access one or more permissions 212 associated with the credential.

FIG. 3 provides an illustration of a menu 300 enabling a user to select from among multiple permissions associated with the credential. Menu 300 may be displayed in response to a user selecting an option to access permissions 212 from the badge 200 as shown in FIG. 2. The menu 300 may include a caption 302 identifying a user associated with the permissions. For example, caption 302 may identify "John Smith" as the user and may further identify "Chief Financial Officer" as the user's position associated with the credential badge 200. An option to close 304 the menu 300 may be displayed, allowing a user to exit the menu 300 that is displaying the permissions. The menu 300 may identify permissions as exclusive permissions 306, where the exclusive permissions 306 may include one or more permissions associated with the credential that are not able to be delegated to another user. As shown in FIG. 3, for example, the menu 300 may include a permission 308 to "Approve Purchase Orders >$100,000," where the permission 308 is not a delegatable permission. The menu 300 may also identify delegatable permissions 310, where permissions listed as delegatable permissions 310 may be capable of being delegated to other users. As shown in FIG. 3, for example, the menu 300 may include permission 312 to "Approve Purchase Orders <$100,000," and permission 314 to "Sign Contracts," where the permissions 312, 314 are delegatable permissions. Permissions 308, 312, and 314 may each be selectable, for example, by touching an area of a presence-sensitive display corresponding to each of the permissions, where selecting a permission enables a user to access additional information about the permission and/or to delegate the permission.

FIG. 4A illustrates an example interface 400 that enables a user to delegate permissions associated with a credential. For example, a user may be provided an interface 400 after selecting a delegatable permission 312 to "Approve Purchase Orders <$100,000." The interface 400 may include a caption 402 identifying the interface as an interface to "Delegate Permissions." In addition, the interface 400, in some instances, provides a caption 406 describing the permission that has been selected for delegation to another user, in this case the permission "To Approve Purchase Orders <$100,000." As shown in FIG. 4A, the interface 400 can also include an option to close 404 the current interface, for example, to exit the current interface and return to the menu 300 displaying permissions associated with the credential.

Interface 400 can include an option to select delegees 408 to receive the permission associated with the credential, in this instance the permission "To Approve Purchase Orders <$100,000." For example, upon choosing option 408, the user may be provided with an interface enabling the user to select one or more delegees to receive the permission.

Interface 400 may also include an option 410 to access conditions associated with the permission, or to apply conditions governing the use of the permission by the delegee. For example, upon selecting the option 410 to access conditions associated with the permission, the user may be provided with an interface displaying the usage conditions for the permission to the user. Additionally or alternatively, the interface displaying the conditions of the permission may enable the user to modify the permission or to modify the conditions associated with a delegee accessing or using the permission. In some instances, conditions applied to the use of a permission may include temporal or geographic conditions. For example, conditions associated with a delegated permission may only allow a delegee to use a permission during business hours and/or when located within a particular office building.

Figure 4B:
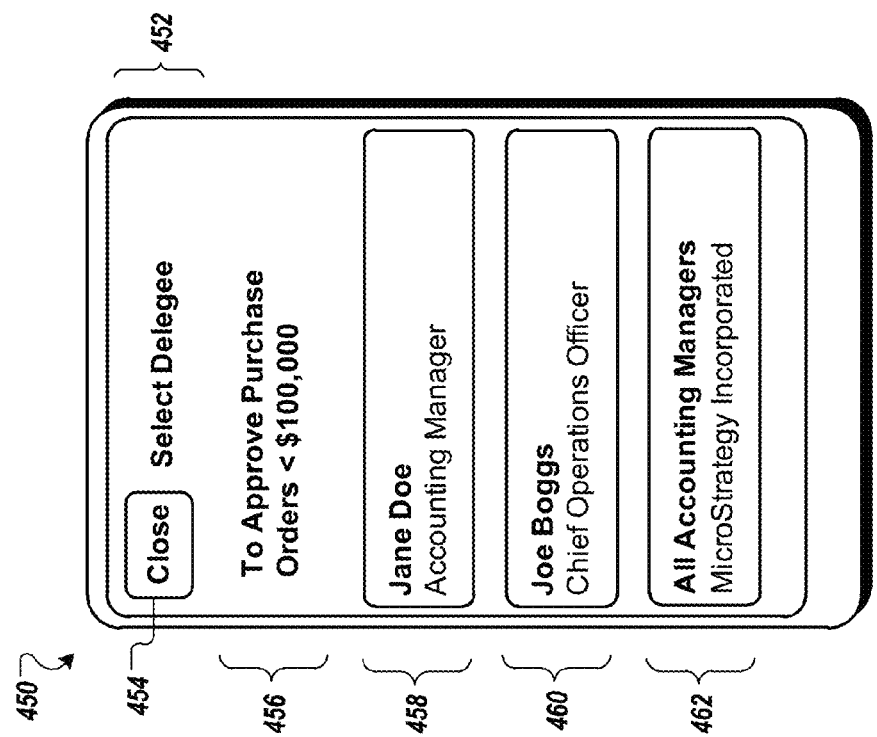

FIG. 4B shows an example representation of an interface 450 that enables a user to select another user to whom to delegate a permission. For example, a user can select the option 408 "Select Delegee" shown in FIG. 4A and can be presented with the interface 450 to select one or more delegees to whom to delegate the particular permission. The interface 450 includes a title 452 "Select Delegee," indicating that user selection of one or more users from the interface 452 will result in the particular permission 456 "To Approve Purchase Orders <$100,000" being delegated to the selected users. As shown, the particular permission 456 "To Approve Purchase Orders <$100,000" may be delegated to any of the users 458-462, including users "Jane Doe," "Joe Boggs," and "All Accounting Managers." The list of potential delegees 458-462 may include any number of particular users, for example, employees within the same company (e.g., employees of "MicroStrategy Incorporated"), employees within specific departments of a company (e.g., employees in the accounting department of "MicroStrategy Incorporated"), employees in a same reporting chain as a delegating user (e.g., employees of MicroStrategy Incorporated" that are in the same reporting chain as the "Chief Financial Offer"), employees having specific roles or titles within a company (e.g., all employees with the title "Accounting Manager" who work for "MicroStrategy Incorporated"), or specific users that have been identified as potential delegees of a particular permission. The list may include the subset of all users to whom the permission may be delegated.

A user may select one of the potential delegees 458-462 shown in interface 450 to delegate the particular permission to the user. In practice, delegating a permission to a user may include associating the particular permission with a credential associated with the delegated user. For example, based on a user "John Smith" selecting the user "Jane Doe" to receive the permission "To Approve Purchase Orders <$100,000," the client device associated with the user "John Smith" may communicate with the central hub or server that manages credentials, where the hub or server may then update the credential associated with the user "Jane Doe" to include the permission "To Approve Purchase Orders <$100,000."

FIG. 5 shows an example representation of a credential associated with a second user. For example, the credential may be a badge 500 associated with a second user who has been delegated a permission associated with a credential held by another user. The second user, according to some implementations, may be a user selected after the "Select Delegee" option 408 has been chosen from the interface 400. The badge 500 associated with the second user may resemble the badge 200 shown in FIG. 2. For example, the badge 500 may include a caption 502, the caption 502 identifying that the badge is a "MicroStrategy Employee Badge" associated with "MicroStrategy Incorporated." The badge 500 may also include an image 504 of the user, as well as a second caption 506 identifying the user. For example, the second caption 506 may identify the user as "Jane Doe" and may further include the position of the user associated with the badge 500, in this instance "Accounting Manager." The badge 500 may further include a swiping slider 508 that enables the user to output, at a client device, different mechanisms for validating the credential. For example, the user may select, using the swiping slider 508, to output a validation mechanism of the credential 510 that is an optical-machine readable representation, such as a quick response (QR) code, or the user may select another representation of the credential. In some instances, a user may output a validation mechanism 510 in connection with an effort to perform an operation related to the specific permission. For example, the user "Jane Doe" may output a validation mechanism related to the permission "To Approve Purchase Orders <$100,000" in an effort to demonstrate that she has permission to approve a particular purchase order. Badge 500 may further include an option 512 to access permissions associated with the credential.

FIG. 6 provides an illustration of a menu 600 that enables a user to view and select from among multiple permissions associated with the badge 500. Menu 600 may be displayed in response to a user selecting an option to access permissions 512 from the badge 500 illustrated in FIG. 5. The menu 600 may include a caption 602 that identifies a user associated with the permissions, as well as a position associated with the user. For example, the caption 602 may identify "Jane Doe" as the user and may further identify "Accounting Manager" as the user's position associated with the badge 500. An option 604 displayed within the menu 600 may allow a user to close the current menu 600. For example, a user may select option 604 to exit the current menu 600 displaying permissions and to return to the badge 500. The menu 600 may display permissions that are delegated permissions 606, wherein the delegated permissions are permissions that have been delegated to the user such that the user can access and utilize the delegated permissions 606.

The delegated permissions 606 may include permissions 608 that have been delegated to the user by another user having the permission. For example, "John Smith," being another user having the permission "To Approve Purchase Orders <$100,000," may have delegated the permission to the user "Jane Doe" by selecting a "Select Delegee" option 408 from an interface 400 and subsequently selecting the user "Jane Doe" as a user to whom the permission should be delegated at the interface 450. Selecting the permission 608 may allow the user to access additional information regarding the permission, to return the permission to the user that delegated the permission, or to delegate the permission to another user. For example, the user may select option 608 to view conditions or other information associated with the delegated permission "To Approve Purchase Orders <$100,000," or to share the permission "To Approve Purchase Orders <$100,000" with another user. In some instances, a delegated permission may be associated with one or more conditions associated with a delegee's ability to access or utilize the delegated permission. For example, a user may have to provide a specific passcode to access or utilize a permission, or the user may only be able to access and utilize the permission when located within certain geographic regions or within a certain distance of the user who delegated the permission to the delegee. Additionally or alternatively, conditions associated with the delegated permission 608 may include the user accessing and/or utilizing the delegated permission only during specified times of the day, or within a certain finite period of time after the permission has been delegated to the user. Additionally or alternatively, conditions associated with the delegated permission 608 may require that the user provide additional confirmation from the user who delegated the permission before accessing and/or using the permission. For example, the user may be required to provide an electronic form of a signature received from the delegator of the permission before accessing and/or using the permission.

Figure 7:
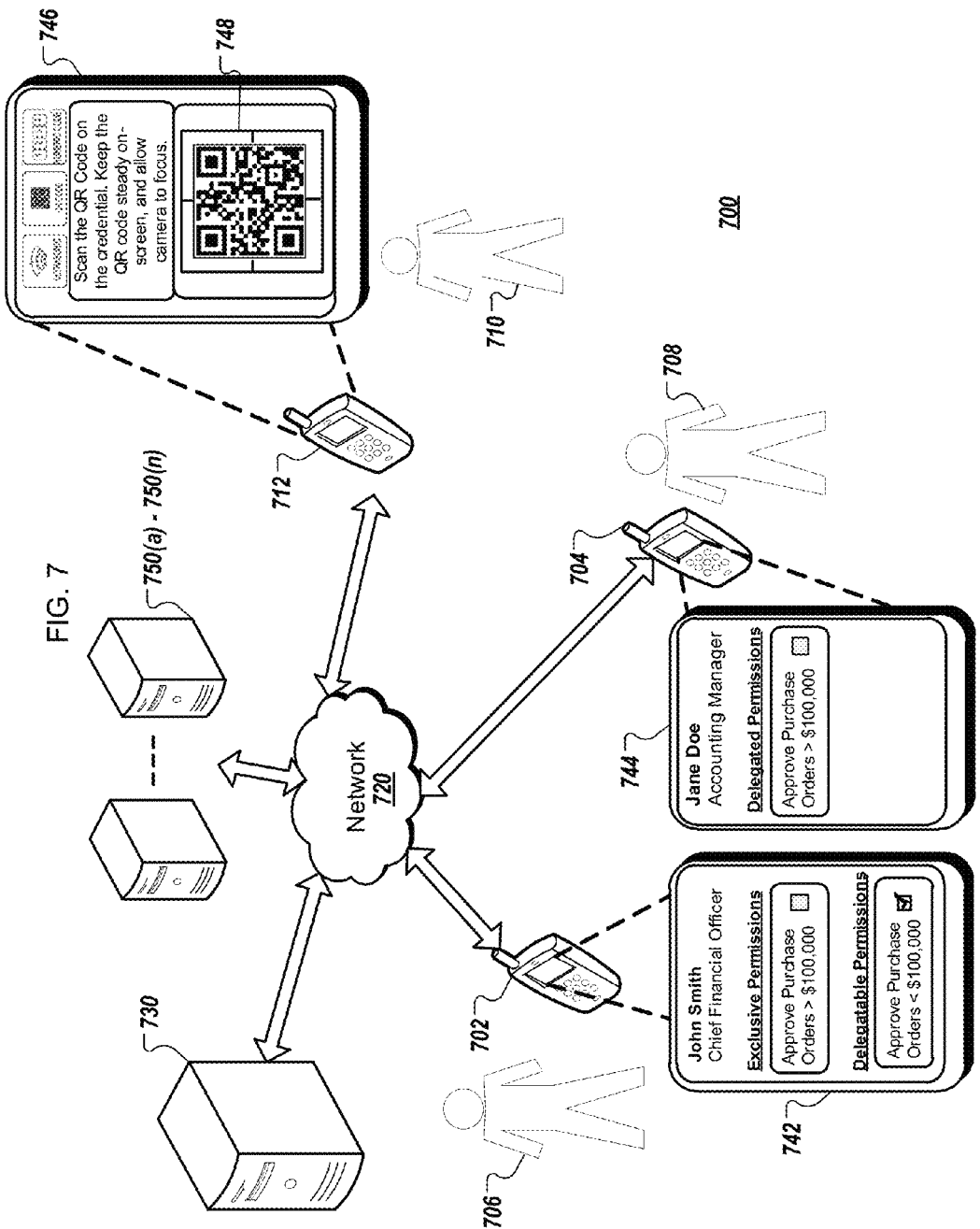
FIG. 7 is a diagram of an example system for management, delegation, and validation of user credentials and permissions.

FIG. 7 shows an example system 700 for the management, delegation, and validation of user credentials and permissions. As an overview, a server 730 communicates via a network 720 with client devices 702, 704 operated by users 706, 708. The server 730 also communicates through a network 720 with a processing system 712 operated by a validation entity 710. The validation entity 710 operates the processing system 712 to validate credentials presented by the users 706, 708 on their client devices 702, 704 by communicating with the server 730. The server 730 obtains one or more credentials associated with users 706, 708 by communicating with one or more credential granting authority computing systems 750(a)-750(n).

Briefly, the system 700 enables users 706, 708 to perform operations that are governed by a computer system. A user 706, 708 can have an account that is maintained on a server 730. Credential granting authorities with computing systems 750(a)-750 (n) may create credentials and may associate one or more permissions with each credential. The credentials can be associated with users 706, 708 at the server 730, enabling the users 706, 708 to exercise the permissions associated with those credentials to perform operations. A user 706, 708 may utilize a permission, for example, by outputting a validation mechanism related to the particular permission at a client device 702, 704 associated with the user, where a processing system 712 associated with a validation entity 710 may then be able to use the validation mechanism to determine whether the request to perform the operation related to the permission is a valid request. Based on the processing system 712 determining that the request to perform the operation is valid, the system 700 may enable the user 706, 708 to perform the requested operation.

Functionally, the server 730 stores and/or manages one or more credentials, associates users with appropriate credentials, and provides credentials to users' client devices 702, 704 and/or processing systems 712 for validation. In practice, each credential may comprise one or more permissions associated with that credential. The server 730 may be any suitable computer or collection of computers executing software capable of managing, delegating, and/or validating representations of credentials for users and groups of users via a network 720 as described herein.

Credentials, permissions associated with the credentials, user accounts, and administrative accounts can be stored in a database, e.g., MySQL, PostgreSQL, MS SQL Server, MongoDB, or other suitable data structure that can be accessed by a server 730. In some instances, the server 730 may access the stored credentials, permissions associated with those credentials, and/or user accounts via web services, such as representations state transfer (REST) style services.

In addition, the system 700 includes a number of computing systems 750(a)-750(n) operated by credential granting authorities. The computing systems 750(a)-750(n) may be external to the server 730 and may be operated by entities that are different from the entity operating the server 730, such as one or more entities that may provide credentials to users. Alternatively, the computing systems 750(a)-750 (n) may be operated by the same entity who operates the server 730, for example, a credential management service entity. For example, the entities associated with the credentials shown in FIG. 1, e.g., a motor vehicle administration, MicroStrategy Incorporated, a non-profit foundation, and XYZ Apartments, each may operate one or more of the computing systems 750(a)-750(n), or a credential management service entity may operate all of the computing systems 750(a)-750(n) in place of the individual entities and in addition to operating the server 730. In some such implementations, computing systems 750(a)-750(n) may be incorporated within server 730. The server 730 may be accessible to the computing systems 750(a)-750(n) over the network 720.

The computing systems 750(a)-750(n) each may be implemented using one or more computing devices, e.g., servers. The one or more computing devices may have internal or external storage components storing data and programs, such as an operating system and one or more application programs. The one or more application programs may be implemented as instructions that are stored in the storage components and that, when executed, cause the one or more computing devices to provide the features ascribed herein to the computing systems 750(a)-750(n). Furthermore, the one or more computing devices each may include one or more processors for executing instructions stored in storage and/or received from one or more other electronic devices, for example, over the network 720. In addition, these computing devices also may include network interfaces and communication devices for sending and receiving data.

In some implementations, the server 730 may receive and/or create a credential and permissions associated with a credential. In some instances, a credential may be received at the server 730 from one or more of the computing systems 750(a)-750(n). Additionally or alternatively, the server 730 may create a credential based on, for example, input received from client devices 702, 704 and/or from a processing system 712. The credential may include a variety of information, such as a credential identifier, one or more permissions associated with the credential, identifiers of the one or more permissions associated with the credential, a description of an event or location, and/or one or more conditions such as a temporal and/or a geographic condition associated with the credential and/or permissions conferred by the credential. In some instances, a credential identifier, or an identifier of a permission associated with a credential, may be represented as a number or an alphanumeric character string that uniquely identifies the particular credential or the particular permission associated with the credential.

The server 730 may present a suitable interface for the creation of a credential, or one or more permissions associated with a credential, where applicable. For example, the server 730 may present a web interface through which a user creating a credential or permission can interact through a web browser. In some implementations, the server 730 may be directly accessible via a graphical-user interface or an application running on a device, such as a client device 702, 704 or processing system 712. Any suitable interface can be used that enables the creation and storage of a credential, one or more permissions associated with the credential, and a user account.

In some instances, a credential or permission may be created by a credential and/or permission issuing organization, e.g., MicroStrategy Incorporated or XYZ Apartments as shown in FIG. 1. The credential issuing organization may establish the credential at a system belonging to the credential issuing organization, where the credential may use a format specified by the central hub or server that manages the credentials. The credential issuing organization may then provide the credential to the central hub or server that manages the credentials, where the credential and permissions associated with the credential may be associated with a user.

Additionally or alternatively, a credential or permission can be created at the request of an authorized user through a web-based or other interface, or through any other suitable mechanism, such as sending email or short message server (SMS) transmissions, for example, to a credential and/or permission grantor. In some implementations, a registered user may be able to create a credential and/or permission by use of an application running on a client device 702, 704.

A credential and/or one or more permissions associated with a credential may be associated with one or more conditions that govern whether a particular credential or permission is valid, for example, in a particular place or at a particular time. A credential granting authority or organization may apply the one or more conditions to a credential or a permission associated with the credential, or the conditions may be selected by a user delegating a permission to another user. For example, an interface may show a menu of potential conditions that can be placed on the usage of a delegated permission, such as time and/or location conditions, and allow a credential/permission grantor or authorized user to identify desired conditions.

In some implementations, a credential granting authority, credential/permission grantor or authorized user may associate a credential, or a permission associated with a credential, with a temporal condition. A temporal condition may identify, for example, a time period or multiple time periods during which a credential and/or permission is valid. The time periods may be identified using any suitable format, including, for example, a specific date or range of dates and times, e.g., from Jan. 1, 2013 at 9:00 AM to Jan. 31, 2013 at 5:00 PM, an expiration date and time, e.g., before 5:00 PM on Jan. 13, 2013, or a recurring day, e.g., every Monday through Friday between 9:00 AM and 5:00 PM. The time periods may be stored in any suitable format. For example, a specific date or range of dates and times may include: a pair of dates with associated times, a starting date with an associated time plus a duration, or a pair of times since epoch. An expiration date and time could be identified by a date and time or a time since epoch. A recurring day and time could be represented as days of the week, e.g., using cron format with Sunday through Saturday represented by integers 0 through 6, and times, e.g., in 12-hour format such as 9:00 AM to 5:00 PM or in 24-hour format such as 0900 to 1700. In some implementations, the temporal condition could be stored as any suitable data object, such as, for example, an eXtensible Markup Language (XML) or JavaScript Object Notation (JSON) object.

Additionally or alternatively, a credential granting authority, credential/permission grantor or authorized user may associate a geographic condition with a credential, or with a permission associated with a credential. A geographic condition can identify, for example, one or more locations such as commercial buildings, geographic regions, particular rooms in a building, large venues, private residences, or any other physical space. The geographic location or locations may be stored as, for example, points identified by a latitude coordinate and a longitude coordinate, e.g., 38.915530, −77.220604, polygons whose boundaries are defined by a set of latitude and longitude coordinate pairs, e.g., 38.910000, −77.220000; 38.810000, −77.220000; 38.810000, −77.120000; 38.910000, −77.12000, street addresses, e.g., 100 Main Street, Washington, DC, etc. In some implementations, the geographic locations may be associated with an indication of a predefined distance from a location, e.g., 1000 yards, that a client device 702, 704 can use to determine whether it has entered or left the location. In some instances, the geographic condition can be stored as any suitable data object, such as, for example, an XML or JSON object.

A credential or a permission associated with the credential may also be associated with combinations of geographic and temporal conditions. In particular, a credential or permission may be valid during certain time periods at one location and at different time periods at a different location. For example, a credential or permission may be valid every Monday through Friday from 9:00 AM to 5:00 PM within 30 miles of Tyson's Corner, Va., and valid every Saturday and Sunday from 6:00 AM to 8:00 PM within 20 miles of Seattle, Wash.

The system 700 may also enable the management and creation of user accounts associated with users, e.g., users 706, 708. In some instances, credential granting authorities may provide, to the server 730, information used to establish and/or supplement user accounts that are associated with users 706, 708. The credential granting authorities may provide the information used to establish and/or supplement the user accounts to the server 730 over the network 720 by using computing systems 750(a)-750(n). The server 730 may also provide an interface so that credential granting authorities and/or authorized users may create user accounts to associate with users 706, 708. For example, the server 730 may present a web interface through which a credential granting authority and/or authorized user can interact via a web browser. Additionally or alternatively, the server 730 may be directly accessible via a graphical-user interface or an application on a mobile device, such as a client device 702, 704. User accounts may be stored in a table or collection of tables in a database, or in any other suitable data structure accessible by the server 730. The user accounts may include a variety of information such as user name or user identifier, e.g., a number or alphanumeric character string that uniquely identifies a user, and/or the addresses of one or more client devices 702, 704 owned by or otherwise associated with the user. User accounts may be created through a web-based or other interface, or through any other suitable mechanism, for example by sending email or SMS to a credential/permission grantor. In some implementations, potential users may be able to create user accounts for themselves by using an application running on a client device 702, 704.

Once a credential, one or more permissions associated with the credential, and one or more users have been created, a credential granting authority, credential/permission grantor, and/or authorized user may associate the credential, or a permission associated with the credential, with one or more user accounts. In some implementations, a credential granting authority may specify one or more user accounts to associate with a particular credential or a particular permission, for example, by providing information to the server 730 that indicates the credential or permission and one or more user profiles to which the credential or permission should be granted. In some implementations, a user may be able to associate their user account with a credential, or with one or more permissions associated with the credential, by use of an application running on a client device 702, 704. Furthermore, the server 730 may notify a user that they have been associated with a particular credential or permission, for example, by pushing a notification to the user's client device 702, 704. Such a notification may include the credential or permission identifier, and/or a key for the user to access, view, or obtain the credential or permission.

Once a credential and one or more permissions associated with the credential have been associated with an appropriate user, the credential and/or permissions can then be distributed to a client device 702, 704 of the user through the network 730. The network 730 may be a local area network (LAN), or a wide area network (WAN), e.g., the Internet. In some implementations, the server 730 may communicate with the client device 702, 704 via SMS or multimedia messaging service (MMS). The server 730 may access a user account in a database to locate the appropriate user's client device 702, 704, and may distribute the credentials and/or permissions to the client device 702, 704 based on identifying that the device is associated with the delegee of the credential or permission. Additionally or alternatively, a user having a client device 702, 704 may request the credential and/or permissions using the client device 702, 704, and the server 730 can confirm that the user holds the particular credential and/or permissions before distributing the credential and/or permissions to the user.

A client device 702, 704 can receive a credential conferring one or more permissions, or one or more delegated permissions, associated with their respective user 706, 708 and store the credential in any suitable memory for later retrieval. A given user 706, 708 may be associated with multiple different credentials that confer different permissions, with each credential and/or permission potentially being subject to different geographic and/or temporal conditions. Some or all of the credentials associated with a user 706, 708 may be accessible on a user's client device 702, 704. In particular, software applications executing on the client devices 702, 704 can retrieve credentials associated with a user 706, 708 so that representations of the credentials may be rendered on the user's client device 702, 704, e.g., as illustrated and described above in connection with FIGS. 1-6. The client device 702, 704 may be any type of computing device, including, but not limited to, a mobile phone, smart phone, personal digital assistant (PDA), music player, e-book reader, tablet computer, laptop or desktop computer, or other stationary or portable device, that includes one or more processors and non-transitory computer readable storage media. The software application can be written in any suitable programming language, such as, for example, Objective-C, C++, Java, etc.

A first user, e.g., user 706, holding a credential that confers the first user 706 a permission may delegate the permission conferred by that credential to one or more other users, e.g., user 708, to provide the one or more other users the ability to use the permission.

For example, user 706 "John Smith," may have a user account and a credential associated with that user account. In this example, one or more delegatable permissions 310 may be conferred by the credential such that the delegatable permissions 310 can be delegated to other users. In addition, as shown in FIG. 3, one or more exclusive permissions 306 also may be conferred by the credential such that the exclusive permissions 310 cannot be delegated to other users.

According to the illustrated example, the user 706 "John Smith" may request to delegate a particular delegatable permission to a user 708, "Jane Doe." The user 706 may select and delegate the permission, for example, using a web interface, or using a graphical user interface or application on a mobile device, such as client device 702, that communicates with server 730 through network 720. In some instances, as described, the user 706 delegating the permission may apply one or more conditions to the use of the delegated permission. For example, the user 706 delegating the permission may specify that the user 708 receiving the delegated permission may only use the delegated permission in certain locations and/or at certain times. In response to receiving an instruction to delegate the permission to the user 708, the server 730 may associate the permission with the user 708, "Jane Doe," and the server 730 may additionally associate any specified conditions on the use of the permission by the user 708 with the delegated permission.

In some implementations, associating the particular delegatable permission with a user may involve adding the delegatable permission to a credential already owned by the delegee. For example, in delegating the permission "To Approve Purchase Orders <$100,000," the credential held by the user 708, "Jane Doe," may be updated to include the permission "To Approve Purchase Orders <$100,000," along with any conditions placed on the usage of the delegated permission. Additionally or alternatively, a new credential may be created when a permission is delegated to a user, and the delegated permission may be associated with the new credential. The system may then associate the new credential with the recipient of the delegated permission to provide the user with the capability to use the delegated permission. For example, based on the user 706 "John Smith" delegating the permission "To Approve Purchase Orders <$100,000" to the user 708 "Jane Doe," a new credential may be created at the server 730 that includes the permission "To Approve Purchase Orders <$100,000," and the credential may be associated with the user account belonging to the user 708 "Jane Doe" to provide the user 708 "Jane Doe" with the delegated permission.

In some implementations, the server 730 may notify the user 708 to whom the permission has been delegated of the delegation of the permission, for example, by pushing a notification to the user's client device 704. Such a notification may include, for example, a permission identifier for the delegated permission, one or more conditions associated with the permission, an indication of the identity of the user 706 who delegated the permission to the user 708 (e.g., an indication of the credential from which the permission was delegated), and/or an access key or code that is required for the user 708 to obtain the delegated permission.

Additionally or alternatively, a delegatable permission may be provided to a user 708 by exchanging a code corresponding to the delegatable permission from a client device 702 associated with the delegating user 706 to a client device 704 associated with the recipient of the delegated permission. In such an instance, a user 706 associated with a delegatable permission may select the permission, for example, from a menu 300 as shown in FIG. 3. The client device 702 associated with the user 706 may then generate or obtain from the server 730 a code related to delegating the particular permission to another user, and output the code at the client device 702. The delegating user 706 may provide the code related to delegating the particular permission to a client device 704 associated with the delegee 708. For example, the code may be a quick response (QR) code, and the delegee 708 may scan the code displayed on an interface of the client device 702 associated with the delegating user 706. The client device 704 may then communicate the code to the server 730, where the server 730 may identify the particular delegatable permission associated with the code and any restrictions associated with the delegee's 708 usage of the delegated permission, and may delegate the particular permission to the user 708, for example, by associating the delegated permission with a credential held by the user 708.

In another implementation, the delegating user 706 may select a permission to delegate to another user, one or more conditions on the usage of the permission by the other user, as well as the particular user with whom the permission should be delegated, and information identifying the permission, one or more conditions, and the delegated user may be communicated to the server 730. The server 730 may then associate the particular permission, along with the one or more usage conditions, with the delegee 708. However, the delegation may not be consummated until the delegee 708 obtains a code from the delegating user 706. For example, to consummate the delegation of the particular permission, the delegee 708 may have to scan, using their client device 704, a validation mechanism or representation of the delegating user's 706 credential that is output at the delegating user's client device 702. Based on the delegee 708 scanning a representation of the credential of the delegating user 706 or scanning another validation mechanism, the server 730 may then consummate the association of the delegated permission with the delegee 708, enabling the delegee 708 to use the delegated permission.

For example, a user 706 "John Smith" with an employee credential for a business, "MicroStrategy Incorporated," may select a delegatable permission to "Approve Purchase Orders <$100,000" and, thereafter, choose to delegate the permission to a second user 708 "Jane Doe" who also has an employee credential for the same business.

According to the example, a client device 702 associated with user 706 is executing an application that displays a user interface 742 including a menu similar to the menu shown in FIG. 3. The menu may include one or more exclusive permissions associated with the credential of the delegating user 706, as well as one or more delegatable permissions associated with the credential. As shown, the delegating user 706 has selected the delegatable permission to "Approve Purchase Orders <$100,000." In some implementations, the client device 702 associated with the delegating user 706 may provide the options presented in the menu of interface 742 based on accessing information stored on server 730 identifying one or more exclusive and/or delegatable permissions associated with the credential.

After selecting the delegatable permission to "Approve Purchase Orders <$100,000," the delegating user 706 may select one or more users as recipients of the delegated permission. For example, the user 706 may perform this operation by accessing interfaces similar to those shown in FIGS. 4A and 4B (not shown in FIG. 7) and by selecting a user 708 "Jane Doe" to receive the delegatable permission (e.g., by selecting an indication of a credential associated with the user 708 "Jane Doe"). As discussed above with respect to FIG. 4B, the pool of users to whom the permission may be delegated may be a subset of all users of the system 700. For instance, the pool of users may be limited to employees within the same company (e.g., employees of "MicroStrategy Incorporated"), employees within specific departments of a company (e.g., employees in the accounting department of "MicroStrategy Incorporated"), employees in a same reporting chain as a delegating user (e.g., employees of MicroStrategy Incorporated" that are in the same reporting chain as the "Chief Executive Offer"), employees having specific roles or titles within a company (e.g., all employees with the title "Accounting Manager" who work for "MicroStrategy Incorporated"), or specific users that have been identified as potential delegees of a particular permission. The pool of users may be displayed to the delegating user 706 to enable the delegating user 706 to select from among only users to whom the permission may be delegated or the pool of users may be referenced to confirm that a selected delegee is within the pool of users.

Upon selecting the user 708 to receive the delegatable permission to "Approve Purchase Orders <$100,000," the client device 702 associated with the delegating user 706 "John Smith" may communicate with server 730 to indicate that the delegatable permission should be delegated to the user 708 "Jane Doe." The server 730 may then associate the permission with the specified user 708 "Jane Doe," as described, for example, by adding the delegated permission to the user's employee credential. Furthermore, the server 730 may notify the user 708 that the user 708 has been delegated the permission associated with "Approving Purchase Orders <$100,000," for example, by pushing a notification to the respective user's client device 704, where the notification may include the credential identifier and/or other information.

At a later point in time, the recipient user 708 "Jane Doe," who has been delegated the permission associated with approving purchase orders of less than $100,000 may access a user interface 744 including a menu, similar to that shown in FIG. 6, indicating one or more delegated permissions. Specifically, the user 708 may access the menu shown in user interface 744 at a point in time after the delegating user 706 has selected a delegatable permission as shown in user interface 742, selected a user 708 as a recipient of the delegated permission, and after the permission has been assigned to the delegated user's 708 credential. The interface 744 may be displayed in connection with the user 708 accessing a specific credential at their client device 704, such as, for example, by accessing an employee badge credential for "MicroStrategy Incorporated" at the client device 704 and accessing a menu that displays any permissions that have been delegated to that employee badge credential.

In some implementations, a first user 706 associated with a credential that confers a delegatable permission may be able to delegate the permission to a second user 708 in the form of a certified instruction to the second user. In such implementations, after the first user 706 selects the permission to be delegated, the first user's client device 702 may generate a document that includes a message indicating that the first user has delegated the permission to the second user 708. The document also may include a representation of the credential of the first user 706 with which the delegated permission is associated and/or a representation of the permission that the first user 706 has delegated to the second user 708. Such representations of the first user's credential and/or the delegated permission may have been generated by or may be communicated to server 730.

The document may be an electronic document and/or the document may be a physical, hardcopy document generated, for example, by sending an electronic version of the document to a printing device. If a representation of the credential of the first user 706 with which the delegated permission is associated is included in the document, the representation of the credential may be encoded or otherwise represented by a computer-readable code, such as, for example, a quick response (QR) code, a barcode, an alphanumeric code, or some other computer-readable representation of the first user's 706 credential. Similarly, if a representation of the delegated permission is included in the document, the representation of the permission may be encoded in or otherwise represented by a computer-readable code, such as, for example, a quick response (QR) code, a barcode, an alphanumeric code, or some other computer-readable representation of the permission.

The first user 706 may provide the document to the second user 708, for example, in electronic and/or physical form. Thereafter, when the second user 708 attempts to exercise the delegated permission, the second user may present the document in connection with the attempt to exercise the delegated permission. Continuing with the example above where the delegated permission is the permission to approve purchase orders less than $100,000, when the second user 708 desires to approve a purchase order less than $100,000, the second user 708 may present the document to the business' accounting division as evidence that the first user 706 has delegated the permission to approve purchase orders less than $100,000 to the second user 708.

If the document includes a representation of the first user's credential, the accounting division then may use a computing device to read the representation of the first user's credential included in the document and to transmit the representation of the first user's credential to server 730. Server 730 then may use the representation of the credential to identify the first user's credential and any permissions associated with the first user's credential. If the first user's credential includes the delegatable permission to "Approve Purchase Orders <$100,000," server 730 may inform the accounting division that the second user 730 is authorized to approve purchase orders less than $100,000.

Additionally or alternatively, if the document includes a representation of the delegated permission, the accounting division may use a computing device to read the representation of the delegated permission included in the document and to transmit the representation of the delegated permission to server 730. Server 730 then may use the representation of the delegated permission to confirm that the permission has been delegated. If server 730 determines that the permission has been delegated, server 730 may inform the accounting division that the second user is authorized to approve purchase orders less than $100,000.

In some implementations, the document also may include a computer-readable code or other reference to the identity of the second user 708 (e.g., the second user's employee credential) identifying the second user 708 as the user to whom the permission has been delegated. In such implementations, the computer-readable code or other reference to the identity of the second user 708 may be input from the document by a computing device and transmitted to server 730 for the purposes of verifying that the second user 708 is, in fact, the user to whom the first user 706 delegated the permission. In such implementations, the second user 708 also may present the second user's credential on the second user's client device 704 for validation, for example, for the purposes of authenticating the identity of the second user 708.

When delegating a permission, such as a permission to "Approve Purchase Orders <$100,000," to a delegee, such as user 708, a delegating user 706 may additionally associate one or more conditions with the use of the permission. Conditions associated with the use of a permission may include, for example, geographic and/or temporal conditions on when the permission may be used. For example, when delegating the permission to approve purchase orders under $100,000 to the user 708 "Jane Doe," the delegator "John Smith" may additionally specify that the user 708 "Jane Doe" only may approve purchase orders under $100,000 at a particular place and/or time, e.g., on Monday from 9:00 AM to 5:00 PM in Tyson's Corner, Va.

In some instances, a permission or credential may only be usable by a user holding the permission or credential when conditions associated with the particular permission or credential are satisfied. For example, a user 708 "Jane Doe" may request to utilize the permission "To Approve Purchase Orders <$100,000" to approve a particular purchase order, and the permission may only enable the user 708 "Jane Doe" to approve the purchase order if the one or more conditions associated with the permission's usage are satisfied. If the one or more conditions associated with a permission or credential are not satisfied, the system 700 may deny the user's ability to utilize the permission.

In some instances, if one or more conditions associated with using a permission or credential are not satisfied, the system may not display the credential of the user, thereby making the user unable to utilize the particular credential or a permission associated with that credential. Additionally or alternatively, if one or more conditions associated with a credential or permission are not satisfied at the time a user attempts to use the particular credential or permission, the system may prevent the user's client device from outputting a validation mechanism related to using the particular credential or permission. For example, a client device 704 associated with a user 708 who has been delegated a particular permission may not output a quick response (QR) code or other validation mechanism related to demonstrating that the user 708 has been delegated the permission if one or more conditions for the usage of the delegated permission are not met. Additionally or alternatively, an interface shown at the client device 704 associated with the delegee 708 may not include the particular permission if one or more conditions on the usage of the particular permission are not satisfied. Additionally or alternatively, when one or more conditions associated with the use of a particular permission are not satisfied, a user 708 who has been delegated a particular permission may still output a validation mechanism for the delegated permission, however, when another party attempts to validate the validation mechanism, the system may indicate that the user's 708 use of the permission is currently invalid. For example, a user 708 "Jane Doe," having been delegated a permission "To Approve Purchase Orders <$100,000" that has a condition that only enables the user 708 to use the permission when located within 30 miles of Tyson's Corner, Va., may attempt to use the permission while located in San Diego, Calif. to approve a purchase order. The client device 704 associated with "Jane Doe" may still output a QR code related to validating the permission, however, when the QR code is scanned by another user to verify that the user 708 has permission to approve the purchase order, the system may return that the presented validation mechanism is invalid and that the user 708 may not approve the purchase order. Additionally or alternatively, if a particular permission relates to a capability to electronically sign a document, the system may prevent the user from being able to apply the electronic signature to a document, based on the system determining that one or more conditions associated with the permission are not satisfied. Similarly, if a particular permission relates to providing a user with access to a particular computer or computer system, the system 700 may prevent the user from being able to access the computer or computer system using the permission based on one or more permissions associated with the permission not being satisfied. Although a number of potential implementations for denying a user to perform actions related to delegated permissions have been described, other implementations are possible.

In some implementations, conditions associated with delegated permissions are enforced locally at client devices 702, 704. In such implementations, when a user 706, 708 attempts to exercise the delegated permission, an application running on the user's client device 702, 704 may identify temporal and/or geographic conditions associated with the delegated permission and determine whether the conditions are satisfied based on the current time and/or the current location of the client device 702,704 before allowing the delegee to exercise the permission.

In order to determine if a temporal condition associated with a delegated permission is satisfied, a client device 702, 704 associated with a user 706, 708 may obtain a current time derived from a timing device of the client device 702, 704. The time can be, for example, a current timestamp, e.g., seconds or milliseconds from epoch, obtained from a timing device, such as a hardware or software clock located at the client device 702, 704. Alternatively or in addition, when the client device 702, 704 has network connectivity, an application may poll another network device, e.g., a network time server, to determine the current time instead of relying on the time indicated by the client device 702, 704. Relying on the network device may reduce a user's ability to manipulate the time on a client device 702, 704 to circumvent temporal conditions associated with a delegated permission.

The client device 702,704 can then compare the current time with any temporal conditions associated with the delegated permission. For example, a temporal condition associated with a delegated permission may specify that the permission is only valid for use before a particular date and time, e.g., Jan. 1, 2013 at 12:00 AM. If the current date and time at the client device 704 associated with the recipient user 708 is then identified as Jan. 2, 2013 at 5:00 PM, the client device 704 may determine that the temporal condition associated with the delegated permission is not satisfied. For instance, an alert may be presented at a user interface of a client device 704 notifying the delegated user 708 that the permission is not valid due to the temporal condition of the delegated permission not being satisfied.

In order to determine if a geographic condition associated with a delegated permission is satisfied, a client device 702, 704, may use GPS coordinates or other geographic location methods, for example, Wi-Fi access point triangulation data, cellular network triangulation data, or IP address information, when the client device 702, 704 has network connectivity.

The client device 702, 704 can then compare the current geographic location of the device 702, 704 with any geographic conditions associated with the delegated permission. For example, a delegated permission associated with a location condition may require that the client device 704 associated with the delegee 708 be within 30 miles of Tyson's Corner, Va. in order for the permission to be exercised. If the client device 704 is greater than 30 miles from Tyson's Corner, Va. when the user 708 attempts to exercise the permission, the client device 704 may determine that the geographic condition is not satisfied and display a message, such as an alert, indicating that the geographic condition is not satisfied.

In some implementations, the logic for enforcing conditions associated with delegated permissions may reside on the server 730, and an application executing on a client device 702, 704 associated with a user 706, 708 may request permission from the server 730 prior to enabling the user 706, 708 to exercise the permission at the client device 702, 704. In such implementations, a client device 702, 704 may first determine whether it currently has network connectivity, as a prerequisite to enabling the delegated permission to be exercised by the user 706, 708.

For example, if a delegated permission has an associated temporal condition, the server 730 may access a current time from a timing device accessible to the server 730, e.g., a local clock associated with a client device or a network time server, when it receives a request from a client device 702, 704 to enable a user 706, 708 to exercise the permission associated with the temporal condition. The server 730 may then approve or deny the request based on determining that the temporal condition is satisfied or is not satisfied, respectively. In some implementations, the server 730 may confirm that a time from a client device 702, 704 associated with the delegee 706, 708 is consistent with the current time obtained at the server 730 to identify any potential manipulations by the delegee 706, 708 associated with the delegated permission.

If a delegated permission has an associated geographic condition, the server 730 may receive location information from a client device 702, 704 as part of the request to validate usage of the permission and determine whether the geographic condition is satisfied. Alternatively or in addition, the server 730 may require that the client device 702, 704 associated with the delegee 706, 708 be connected to a particular network, e.g., a specific Wi-Fi network or cellular base station, that is associated with a geographic location at which the delegated permission is valid. In some implementations, a processing system 712 used to validate a user's request to use a permission may send its location information to the server 730 as part of the request, in addition to or instead of the location information obtained from the client device 702, 704, and the server 730 may determine whether the geographic condition is satisfied based on the location information received from the processing system 712.

In some instances, a geographic condition may require a client device 704 associated with a user 708 who has been delegated a permission to be within a threshold distance of a client device 702 associated with a user 706 who has delegated the permission. In such instances, the system 700 may obtain location information from the client device 704 associated with the delegee as well as location information from the client device 702 associated with the delegator, and determine whether the geographic condition is satisfied based on the distance between the two client devices 702, 704. For example, a geographic condition may require that a client device 704 associated with a delegee be located within 100 yards of a client device 702 associated with a delegator for the use of a delegated permission to be valid. Using location information obtained from both client devices 702, 704, the server 730 may approve or deny the request to exercise the delegated permission based on determining that the obtained location information satisfies or does not satisfy the geographic condition, respectively. If the particular geographic condition is satisfied, the system may enable the delegee to utilize the permission, for example, by enabling the delegee to output a validation mechanism for the particular permission at a client device 704 associated with the delegee, or by enabling the delegee to otherwise perform operations related to the permission. If the particular geographic condition is not satisfied, the system may prohibit the use of the permission by the delegee, for example, by preventing the output of a validation mechanism for the particular permission at the client device 704 associated with the delegee, or by otherwise prohibiting the delegee from performing operations relevant to the permission. In some implementations, a validation mechanism for a permission may be output at a user interface of a client device 702, 704 enabling the user 706, 708 associated with the client device 702, 704 to exercise the permission. The validation mechanism for the permission may take a variety of different forms. For example, among other mechanisms, the validation mechanism may be an alphanumeric code, an encoded signal, an optical machine-readable representation, e.g., a barcode or a quick response (QR) code, a parametrically-generated graphical representation, an animated graphic representation, and/or a phrase. In some applications, these mechanisms may also be used to encode data describing a user credential, information contained in reference to a user credential, or other data related to the use of permissions associated with a user.

As referred to herein, an alphanumeric code may be a sequence of numbers and/or letters, e.g., 4 to 24 characters, that is associated with a permission. In some instances, a given numeric representation will only be valid for a certain time period. In operation, applications for generating and providing validation mechanisms operate on client devices 702, 704 and the processing system 712. The server 730 associates an alphanumeric code with a permission, and distributes the alphanumeric codes to the user's client device 702, 704. The client device 702, 704 also may be able to derive the alphanumeric code based on information previously provided by the server 730 (e.g., parameters to apply to an equation that generates codes based on the parameters and time of day). When a user 706, 708 presents an alphanumeric code to the validation entity 710, the processing system 712 can validate the alphanumeric code by communicating with the server 730, and receiving a response indicating whether the presented alphanumeric code matches a valid alphanumeric code at the time it is presented, e.g., a valid alphanumeric code corresponding to exercising a particular permission. In response to being validated by the processing system 712, the system may display a message indicating successful validation and enable the user 706, 708 to perform operations related to the particular validated permission.

As referred to herein, an optical machine-readable representation of a credential may be an arrangement of graphical elements that encode alphanumeric data, where the elements are arranged so that the data can be read by an optical scanner. For example, an optical machine-readable representation may be a bar code, a quick response (QR) code, or an Aztec code, among other optical machine-readable representations.

A client device 702, 704 may use any suitable technique for encoding alphanumeric data into an optical machine-readable validation mechanism. For example, a client device 702, 704 may call a function or library routine that encodes a quick response (QR) code in accordance with the quick response (QR) code International Organization for Standardization (ISR) standard, ISO/IEC 18004:2006 RSS, Information technology—Automatic identification and data capture techniques—QR Code 2005 bar code symbology specification. Similarly, the server 730 may generate an alphanumeric code and encode the alphanumeric code into an optical machine-readable representation, and may provide the code and/or the optical machine readable representation to the client device 702, 704.

When a client device 702, 704 outputs an optical machine-readable validation mechanism, a validation entity 710 can operate a processing system 712 to validate the optical machine-readable representation, as shown in the interface 748, in which an optical machine-readable representation is scanned by the processing system 712 and decoded to determine whether the presented validation mechanism enables a user to exercise a particular permission.

The processing system 712 may use any suitable mechanism to scan and decode the optical machine-readable representation. For example, the processing system 712 may access a function or library routine that captures and decodes quick response (QR) codes and/or barcodes using a camera operatively coupled to the processing system 712. The processing system 712 can then validate the optical machine-readable representation by communicating data corresponding to the alphanumeric characters that were encoded in the representation to the server 730, where the server 730 may verify that the particular alphanumeric character string corresponds to a validation code for using the particular permission. The processing system 712 receives a response indicating whether the presented optical machine-readable representation corresponds to a permission that is currently associated with a user at the point in time the processing system 712 communicates the alphanumeric code to the server 730.

As described herein, an encoded signal representation of a credential may be any computer readable signal modified to encode data. In some instances, the signal may be a sound signal, a Bluetooth signal, a near field communication (NFC) signal, or any other transitory signal that encodes data. For applications in which the encoded signal is a sound signal, the signal may comprise sound signals in which an oscillation of pressure waves transmitted through the air are modulated to encode information. Any suitable modulation scheme can be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

The signal may encode data used to verify usage of a permission, may encode information related to a user credential, or may encode any other suitable data. In addition, the signal may encode other identifiers that are linked to or otherwise associated with credential identifiers, for example, conditions associated with permissions. In instances in which the encoded signal is a sound signal, the client device may use any suitable technique for encoding the sound signal. For example, the client device may call a function or library routine that encodes data into sound signals, such as the Zoosh SDK by Naratte, Inc. A client device 702, 704 can then output the sound signal from a speaker coupled to the client device for reception by the processing system 712.

When a client device 702, 704 outputs a sound signal, the validation entity 710 can operate the processing system 712 to receive the sound signal at a speaker of the processing system and decode the sound signal to generate a set of alphanumeric characters that were encoded in the sound signal. The processing system 712 may use any suitable mechanism to receive and decode the sound signal. The processing system 712 can then validate the alphanumeric characters by communicating with the server 730, where the server 730 may determine whether the alphanumeric characters match an alphanumeric code related to the particular permission. In response, the processing system 712 may receive a response indicating that the alphanumeric characters encoded in the sound signal correspond to a valid permission delegated to a credential associated with the user, or to a valid permission at the point in time the sound signal was processed by the system 700.

In some implementations, a user may request to exercise a particular permission and may provide, using a client device 702, 704 associated with the user, a graphical representation of a validation mechanism for the permission for visual inspection by another user. As referred to herein, a parametrically-generated graphical representation of a validation mechanism may be a visual display that is generated using one or more parameters as inputs to one or more mathematical equations, such as a three-dimensional rendering of an object or an image of a fractal. In certain implementations, the parameters can be generated from seed values such as, e.g., a credential or permission identifier and a time. In operation, a client device 702, 704 can obtain an identifier, e.g., from a memory of the client device used to store the identifier when previously provided to the client device by the server 730, and a time, e.g., from a timing device of the client device 702, 704, and generate a parametrically generated graphical representation for the validation mechanism using the identifier and time as seed values. In other implementations, the client device 702, 704 may receive the graphical representation from a server 730, where the graphical representation may then be stored by the client device 702, 704 for later use. Similarly, for validation, the processing system 712 may obtain an identifier and a time, and may generate and/or receive from a server 730 a parametrically generated graphical validation mechanism for the permission in the same manner. When the timing device at the processing system 712 is synchronized with the timing devices at client device 702, 704, the parameters output at the processing system 712 should be identical, or nearly identical, to those of the client device 702, 704 when the identifiers are the same. The graphical representation generated by processing system 712 should therefore match the graphical representations on the client device 702, 704 allowing the validation entity 710 to visually validate the credential or permission presented on the client device 702, 704. A user of the processing system 712 and the client device 702, 704 may determine the proper validation mechanism to output to enable usage of the permission, for example, by selecting the particular permission from among a menu of permissions. For example, a user 708 who has been delegated a permission "To Approve Purchase Orders <$100,000" may request to use the permission, may output a graphical representation of a validation mechanism for the permission, and the validation entity 710 associated with the processing system 712 may select to output a graphical representation of the permission by selecting the permission "To Approve Purchase Orders <$100,000" from a menu of possible permissions, where the two graphical representations can then be compared, as described.

In some examples, animated graphical representations may be used as validation mechanisms. In these examples, a client device 702, 704 may display an animated graphical representation generated using a specific process, and a user may present the displayed graphical representation to another user for validation by visual inspection (e.g., visual comparison to an animated graphical representation generated using the specific process and displayed on a device of the other user). As referred to herein, an animated graphical representation of a validation mechanism may be, for example, a hypertext markup language (HTML) animation, animated graphical interchange format (GIF) file, Motion Pictures Expert Group (MPEG) file, Adobe Flash animation, or any combination thereof. An animation may be, for example, a sequence of images defined by one of these files. Applications executing on the client device 702, 704 may access the stored graphical representations by way of index values, where an index value may correspond to a single representation. In operation, a client device 702, 704 obtains a credential identifier, e.g., from a memory of the client device used to store the identifier when previously provided to the client device by the server 730, and a time, e.g., from a timing device of the client device, and selects an animated graphical representation for the credential or permission by using the identifier and the time to generate an index value. In some implementations, the client device 702, 704 may obtain the animated graphical representation of the validation mechanism from a server 730, and may store the graphical representation for later output. Similarly, for validation, the processing system 712 obtains an identifier and a time, and selects an animated graphical representation for the credential or permission in the same manner as the client devices 702, 704. When the timing device at the processing system 712 is synchronized with the timing device at client device 702, 704, the index values generated at the processing system 712 should be substantially identical to those of the client device 702, 704 when the identifiers are the same. The graphical representation selected by processing system 712 should therefore match, or nearly match, the graphical representations on the client devices 702, 704 allowing the validation entity 710 to visually validate the permission presented on the client device 702,704. A user of the processing system 712 and the client device 702, 704 may determine the proper animated graphical representation to output to enable usage of the permission, for example, by selecting the particular permission from among a menu of permissions. For example, a user 708 who has been delegated a permission "To Approve Purchase Orders <$100,000" may request to use the permission, may output an animated graphical representation of a validation mechanism for the permission, and the validation entity 710 associated with the processing system 712 may select to output an animated graphical representation of the permission by selecting the permission "To Approve Purchase Orders <$100,000" from a menu of possible permissions, where the two animated graphical representations can then be compared, as described.

As referred to herein, a phrase representation of a validation mechanism for a permission may be a sequence of two or more words selected from one or more dictionaries of words that need not form a grammatical construct. A dictionary as used herein is a data structure in which index values identify words. A given dictionary may include many thousands of different words. In operation, applications executing on the client device 702, 704 and the processing system 712 can access a common set of dictionaries for generating phrases, and may access a common index value, so that when the applications reference the same index values in the same dictionaries, at substantially the same time, they can select the same phrases. In some implementations, the server 730 may provide the processing system 712 and the client device 702, 704 with the same index value for selecting phrases, for example, based on users of the processing system 712 and the client device 702, 704 requesting to output a phrase validation mechanism for a particular permission at substantially the same time. Thus, the processing system 712 displays the same phrase as the client device 702, 704 which enables the validation entity 710 to validate the phrases at the client device 702, 704.

When the server 730 receives a validation request message from the processing system 712, it attempts to confirm that the presented validation mechanism is valid. In particular, the server 730 may decode a set of alphanumeric characters and/or parse an alphanumeric code to obtain an identifier of the permission or user credentials associated with the permission. The server 730 can then access the corresponding credential or permission using the identifier, e.g., from a database by querying using the identifier. Upon retrieving the credential or permission, the server 730 can determine whether the presented representation was valid by comparing data received in the validation request message with data associated with the retrieved credential or permission. For example, the server 730 may determine that a code included in the validation request corresponds to an authorized code for the permission or a user of the permission, e.g., a delegated user of a permission. In some implementations, the processing system 712 may perform some or all of the validation for the permission.

In some implementations, if the representation is validated, the validation response may include an image, a name, and/or other data relating to the validated user including, e.g., a copy of the user's credential or the permission associated with that credential. The server 730 may obtain information relating to the user, e.g., an image of the user, from the credential grantor. For example, the processing system 712 may display the user's name and the user's image. In some implementations, responsive to receiving a validation response from the server 730, the processing system 712 may obtain the user's image from, for example, a memory of the processing system 712, the server 730, a server made accessible by the credential grantor, a computing system 750(a)-750(n) associated with a credential granting authority, or another server. The processing system 712 may then output the user's image to a display operatively coupled to the processing system 712. Additionally or alternatively, the system may output a response that includes mention of the identified permission that has been verified, for example, an indication that the requesting user is permitted to use the permission "To Approve Purchase Orders <$100,000."

While illustrated in FIG. 7 as a person, the validation entity 710 can be any agent capable of validating representations of credentials or permissions presented by users. As an example, the validation entity 710 could be a software application executing on the processing system 712 that processes a representation received from a client device 702, 704, decodes the representation to generate an alphanumeric set of characters, transmits the alphanumeric set of characters to the server 730, and receives a response from the server 730 indicating that the representation is valid. According to the example shown in FIG. 7, the software application could then enable a user 706, 708 to perform a financial transaction. The processing system 712 can also be any suitable computer or set of computers capable of communicating with the server 730 via network 720, such as a mobile phone, a smart phone, PDA, tablet computer, laptop or desktop computer, or other stationary or portable device, that includes one or more processors and non-transitory computer readable media.

In some implementations, codes presented by a user 706, 708 for validation by the processing system 712 may be codes that represent validation mechanisms for particular permissions or codes that represent particular credentials (that confer one or more permissions). For example, a user 706, 708 may present a code that identifies a particular permission, where the processing system 712 may process the code to determine whether the user 706, 708 may exercise the particular permission. Alternatively, the user 706, 708 may provide a representation of a credential associated with the user 706, 708 that has requested to use a permission associated with that credential. For example, the credential may be a credential associated with the user that has a plurality of associated permissions, such as an employee badge, or may be a credential that has been created for a single delegated permission, such as a unique credential associated with the user 708 that only is associated with the delegated permission "To Approve Purchase Orders <$100,000." Responsive to receiving a representation of a particular credential in conjunction with a request to exercise a particular permission, the processing system 712 may determine whether a particular credential is a valid credential, and may also determine whether the validly-issued credential authorizes the user to exercise the delegated permission.

Based on the processing system 712 determining that a request to perform an operation relating to a particular permission is valid, the system may respond in a number of fashions to enable the user 706, 708 to perform the operation. In some implementations, if the processing system 712 determines that a validation mechanism provided by a user 706, 708 identifies a valid credential, the system may output a list of possible permissions that the user 706, 708 may use. Additionally or alternatively, successful validation by the processing system 712 may result in the requested operation being performed automatically by the system. For example, if the particular permission relates to accessing a computer system, successful validation of the permission may result in the user 706, 708 automatically being granted access to the computer system (e.g., automatically being logged into the computer system). Similarly, if the particular permission relates to entering a physical space protected by a locked door, successful validation of the permission may result in the locked door being opened or unlocked automatically.

In some instances, a validation mechanism for a permission or a representation of a credential may be used as a method of electronically signing a document. The electronic signature may then be validated by a processing system 712 to verify that the user 706, 708 that included the electronic signature is permitted to perform operations relating to the document, where the system may then enable the particular operations to occur. For example, a user 706, 708 having a permission "To Approve Purchase Orders <$100,000" may electronically sign a purchase order form using a validation mechanism for the particular permission (e.g., by embedding a QR code or other representation in the purchase order form). A processing system 712 may then analyze the electronic signature to determine whether the user 706, 708 has permission to approve such a purchase order.

Figure 8:
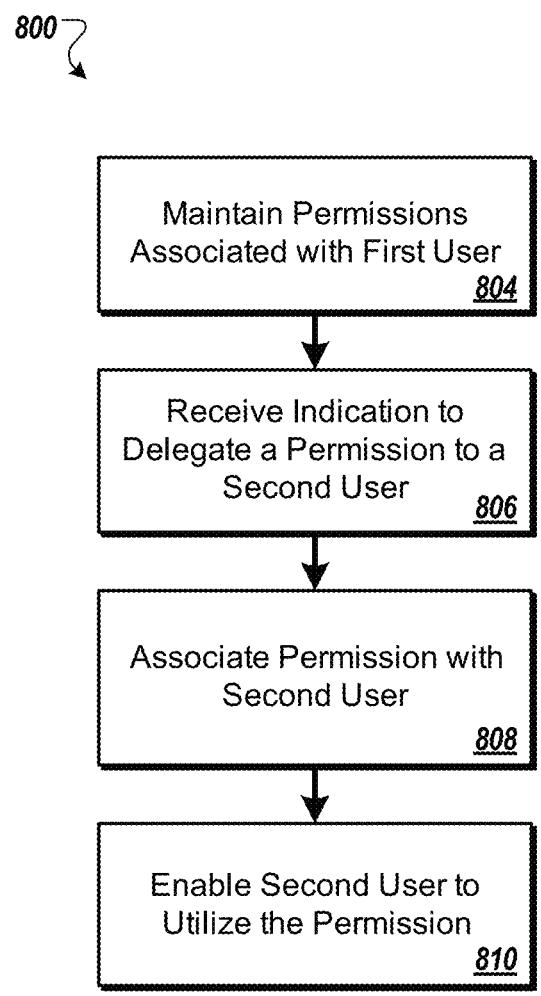
FIG. 8 is a flowchart of an example process for maintaining and delegating permissions.

FIG. 8 illustrates an example process 800 performed at a server, such as server 730, for maintaining and enabling delegation of permissions. The server maintains permissions associated with credentials of a first user (804). For instance, the server receives and maintains credentials linked to user accounts, each credential being associated with one or more permissions. Specifically, the server, such as server 730, maintains a user account associated with a first user, for example, a user 706, and maintains a credential associated with that user account that confers one or more permissions. Continuing with the example introduced above, the user 706 may be a user 706 "John Smith" who has an employee credential for "MicroStrategy Incorporated" that confers one or more permissions. As described above, the one or more permissions may include exclusive permissions, such as a permission to "Approve Purchase Orders >$100,000," as well as delegatable permissions, such as a permission to "Approve Purchase Orders <$100,000."

The server receives an indication that the first user has chosen to delegate a particular permission from amongst the one or more permissions to a second user (806). For example, the first user 706 "John Smith" may select a particular delegatable permission to "Approve Purchase Orders <$100,000" and may furthermore choose to delegate the permission to a second user, such as second user 708 "Jane Doe." The server may receive an indication, for example, from a client device 702 associated with the first user 706, indicating that the particular permission should be delegated to the second user.

In response to receiving the indication, the server associates the particular permission with the specified second user (808). For example, the server, based on receiving the indication, may associate the delegatable permission to "Approve Purchase Orders <$100,000" to the second user 708, "Jane Doe." Associating the delegated permission with the second user may involve, for example, adding the delegated permission to a credential associated with the second user.

In some instances, associating the permission with the second user may involve verifying that the selected permission is a delegatable permission that can be delegated by the first user to the second user. Additionally or alternatively, associating the permission with the second user may involve verifying that the identified second user can receive the particular permission, e.g., that there are no restrictions on the particular permission limiting the permission from being delegated to the second user. In some implementations, the server, such as a server 730, may also identify one or more conditions placed on exercising the permission by the delegee, such as, for example, any temporal or geographic conditions, as described above. Based on verifying that the permission is a delegatable permission and that the identified second user is an authorized delegee of the permission, the system may associate the delegated permission to the second user along with any conditions applied to the delegating of the permission.

The server enables the second user to exercise the delegated permission (810). For example, a server 730 may enable the second user 708 "Jane Doe" to utilize the delegated permission to perform actions associated with approving purchase orders of less than $100,000. In some instances, enabling the second user to exercise the delegated permission may involve associating the delegated permission with an existing credential of the second user. For example, the server 730 may provide the client device 704 associated with the second user 708 a new representation of the credential (e.g., a new badge that identifies the delegated permission as a permission conferred by the credential) or the server 730 may adjust the current credential to further include the delegated permission. In some instances, the server may notify the second user that a permission has been delegated to the second user, and that the second user's credential has been adjusted to include the delegated permission. The notification may further include a representation of the delegated permission or a representation of their credential that includes the permission. In some instances, the notification may also indicate one or more conditions associated with use of the delegated permission, when such conditions have been applied to the delegated permission by the first user. The notification may be, for example, a push notification sent to a client device 704 associated with a second user 708, or any other notification.

Figure 9:
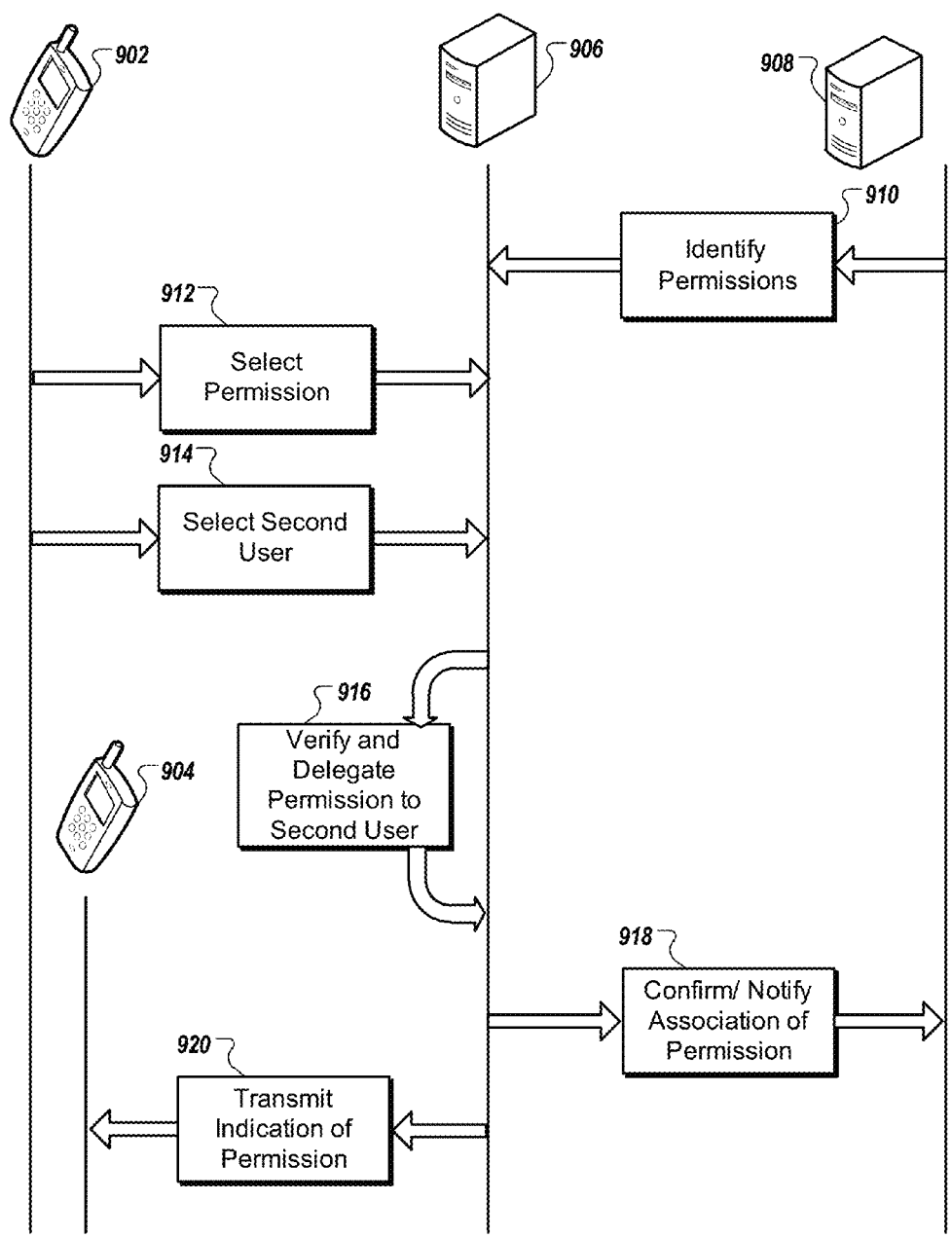
FIG. 9 is a messaging diagram that illustrates examples of messages between various components of a system for delegating permissions.

FIG. 9 provides a messaging diagram of examples of messages transmitted between various components of a system for maintaining and delegating permissions. Briefly, interacting components in FIG. 9 include a client device 902 associated with a first user, a client device 904 associated with a second user, a server 906, and a computing system 908 associated with a credential granting authority. Messages communicated between the various components 902, 904, 906, and 908 may enable a first user to delegate a permission to a second user. The messages described may be transmitted via any suitable protocol, for example, using hypertext transfer protocol (HTTP) or SMS. Additionally, these example messages should not be considered limiting, as any suitable mechanism for performing the functions described could be used, and the messages could be sent or received in any suitable sequence.

Initially, server 906 receives indications of one or more permissions associated with a user credential (910). The messages may be generated and sent from a computing system 908 associated with a credential granting authority. As described, the server 906 may store these credentials associated with user accounts and may further store information identifying the one or more permissions associated with one or more of the credentials.

The client device 902 associated with a first user transmits a message to the server 906 (912). In some instances, the message may be sent based on the first user indicating at a client device 902 a request to delegate a particular permission associated with that user's credential to a second user. The server 906 receives the message.

Additionally, the same first user may indicate at the client device 902 a second user to whom to delegate the selected permission, and the client device 902 may transmit a message to the server 906 identifying the second user as the user selected to receive the delegated permission (914). The server 906 receives the message indicating the second user.

In response to receiving the message indicating the permission to be delegated and the message identifying the second user as the user selected to receive the delegated permission, the server 906 determines if the request sent by the first user is valid. In some implementations, determining that the request sent by the first user is valid may involve evaluating conditions associated with the delegation of the permission, where the conditions may be provided by the credential granting authority associated with the permission. For example, the server 906 may evaluate whether the permission is a delegatable permission. Additionally or alternatively, the server 906 may determine if there are one or more other conditions associated with the authority of the first user to delegate the permission to a second user. For instance, conditions associated with the permission may specify that the particular delegatable credential is only delegatable during certain times or when the first user is located within certain locations, or based on any number of other conditions. Additionally, the server 906 may determine if the second user is a valid recipient of the delegated permission, for example, by evaluating conditions associated with the permission. For instance, conditions associated with the permission may specify that the particular delegatable permission is only delegatable to users who possess one or more specified credentials and/or to whom one or more other permissions have been conferred, e.g., co-requisites or prerequisites associated with the permission. Additionally or alternatively, conditions associated with the permission may specify that the permission can only be delegated to users within the same company, or may specify that the permission can only be delegated to users holding certain titles or positions within the company. Upon determining that the messages identify a valid permission and a valid second user to whom the identified permission can be delegated, the server 906 verifies and associates the delegated permission with the second user (916). The delegation may be performed, for example, by associating the permission with a credential assigned to the second user, or by another method.

Following the delegation of the identified permission to the second user, the server 906 sends a message from the server 906 to the computing system 908 associated with the credential granting authority notifying the credential granting authority that the particular permission has been delegated to the second user (918). For example, the message may indicate that the permission has been delegated to the user account associated with the second user, that the user account associated with the first user has delegated the permission to the second user, and/or that one or more conditions on exercising the delegated permission have been associated with the delegated permission. In response to receiving the message, the computing system 908 of the credential granting authority may update data stored in association with the user account of the first user and/or the user account of the second user to reflect the information conveyed in the message.

The server 906 also sends a message from the server 906 to the client device 904 associated with the second user indicating that the permission has been delegated to the second user (920). For example, a representation of the delegated permission may be transmitted to the client device 904 associated with the recipient of the permission that allows the second user to exercise the delegated permission. In some instances, the representation may be a code associated with the permission, e.g., an alphanumeric code, a quick response (QR) code, a barcode, or an encoded signal, such as an ultrasonic or other sound signal code. Additionally or alternatively, the server 906 may provide the client device 904 with a modified or new version of a credential already held by the second user that indicates that the credential now confers the authority to exercise the delegated permission on the second employee.

Figure 10:
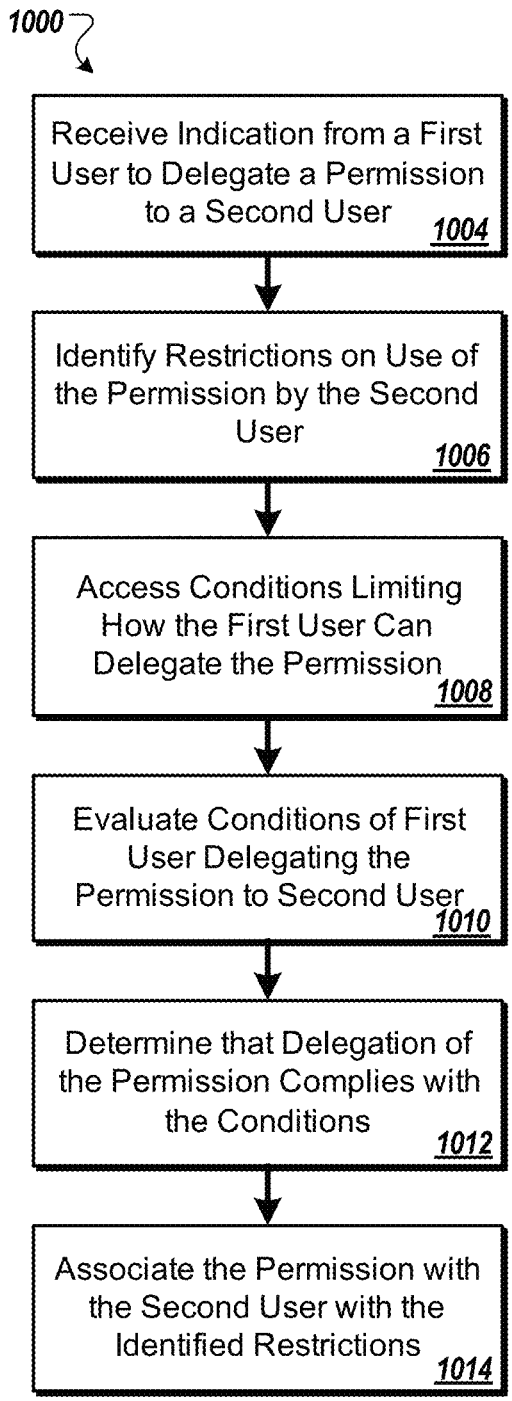
FIG. 10 is a flowchart of an example process for enabling a user to delegate a permission to another user and for delegating the permission.

FIG. 10 illustrates an example process 1000 for enabling a first user to delegate a permission to a second user and for associating the delegated permission with the second user. The process 1000 may be performed at a server, such as server 730.

As shown, the server receives an indication from a first user requesting to delegate a particular permission to a second user (1004). For example, the system may receive, at a server from a first user using a client device, an indication identifying a particular delegatable permission as well as an indication of a second user to receive the delegated permission. The identified permission may be a delegatable permission that is associated with a credential held by the first user. For example, a first user "John Smith" with a user account associated with a credential that includes a permission to "Approve Purchase Orders <$100,000" may select the permission as well as a user account associated with a second user "Jane Doe" to be delegated the permission. The selection of the delegatable permission and the second user may be performed at a client device associated with the first user "John Smith" and a message identifying the selections may be received at a server.

The server also receives an indication identifying one or more restrictions to be applied to use of the delegated permission by the recipient (1006). For example, the server may receive an indication from a client device associated with the first user identifying one or more restrictions to apply to the use of the delegated permission by the second user. In some instances, such restrictions may be one or more temporal and/or geographic conditions that must be satisfied for the second user to be able to execute the delegated permission.

The server accesses one or more conditions limiting the delegation of the selected permission by the first user (1008). In some instances, conditions may specify that a first user with a credential that confers a particular delegatable permission can only delegate the permission to a second user during certain times or when the client device of the first user in certain geographic locations, as described. For example, conditions may specify that a first user "John Smith" may only delegate a permission to "Approve Purchase Orders <$100,000" when the time is between 9:00 AM and 5:00 PM on days Monday through Friday, or when located within 30 miles of Tyson's Corner, Va. Additionally, conditions may limit the possible recipients that the first user can select to receive the delegated permission. For example, a second user may have to hold a certain position within a company, or may have to satisfy other conditions in order to be eligible to receive the particular delegated permission.

The server evaluates the conditions governing the delegation of the particular permission by the first user to the second user (1010). In some instances, the system obtains information relevant to evaluating the conditions associated with delegating the particular permission. For example, the system may obtain information relevant to the location of a client device associated with the first user, the system may obtain information relating to a current time, day, or date, and/or the system may obtain any other information relevant to evaluating the one or more conditions. Once the system has obtained the relevant information, the system may evaluate the conditions associated with the delegation of the particular permission by the first user. In some instances, the server determines if the location of a client device associated with the first user satisfies a geographic condition, for example, if the client device is located within 30 miles of Tyson's Corner, Va. Additionally or alternatively, the server determines if the current time satisfies one or more time conditions, for example, if the current time is within 9:00 AM and 5:00 PM and if the day is one of a Monday, Tuesday, Wednesday, Thursday, or Friday. In some examples, other conditions may be associated with the delegation of the particular permission by the first user, and may be evaluated using other relevant information.

The system determines that the delegation of the particular permission by the first user to the second user is a valid delegation (1012). Upon evaluating the conditions, the system may determine that all of the conditions are satisfied, and thus that the particular permission should be delegated to the second user. In some instances, the system may determine both that the location of the client device associated with the first user satisfies a geographic condition, for example, that the client device is located only 10 miles from Tyson's Corner, Va., and that the time of the request also satisfies a time condition, for example, that the time is 12:00 PM on a Wednesday. Based on determining that the conditions associated with the first user delegating the particular permission to the second user are satisfied, the system may transmit a signal indicating that the particular permission may be delegated to the second user.

The system delegates the particular permission to the second user (1014). In some implementations, the system delegates the permission to the second user by associating the permission with a credential belonging to the second user, as described. In addition, the system may identify the one or more restrictions indicated by the first user pertaining to the usage of the delegated permission by the second user, and may associate these conditions with the delegated permission. For example, the system may determine that the first user has indicated that the delegated permission should only be available to the second user for up to 48 hours from the time the permission is delegated. Consequently, the system may associate that restriction with the permission delegated to the second user.

As discussed, delegating the permission to the second user may involve modifying a credential associated with the second user's user account to include the delegated permission. After delegation, the delegated permission may usable by the second user, so long as the identified conditions are satisfied. The system may additionally transmit one or more signals indicating that the permission has been delegated to the second user, such as notifications output at a client device associated with the second user, signals sent to a credential management authority indicating that the permission has been delegated, and/or other signals or notifications.

Figure 11:
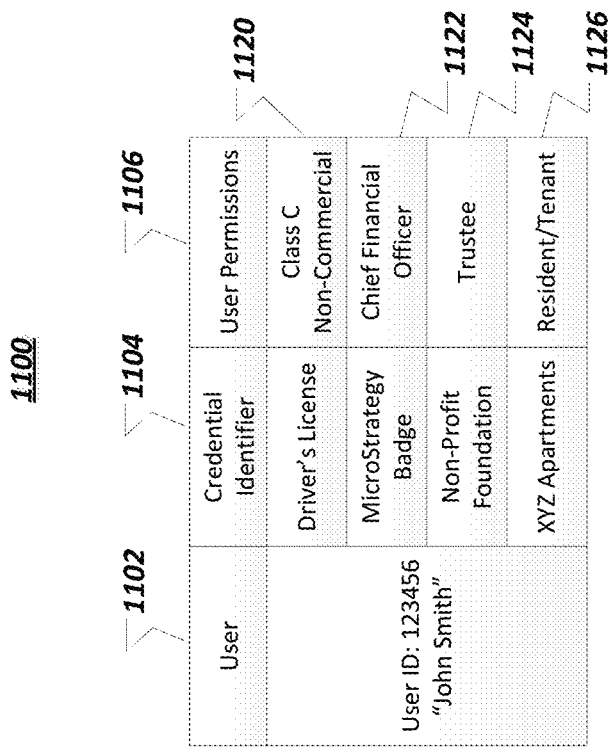
FIG. 11 is a representation of an example implementation of a data structure for storing and maintaining credentials associated with a user.

FIG. 11 provides an illustration of an example data structure 1100 for maintaining one or more credentials stored on a server. The data structure 1100 stores credential data for a particular user and the system may include data stored in the data structure 1100 for each of the multiple, different users for which the system maintains credentials. While the data structure 1100 is shown here as a table data structure, in practice, any number of other data structures may be used to achieve a similar result. In addition, the data structure 1100 may include more information or less information than shown, or may include different information from that illustrated.

The data structure 1100 includes a first column 1102 for a user identifier. In some implementations, the user identifier may be represented as an identification number and the value shown in the first column 1102 may identify the user. The data structure 1100 includes a second column 1104 for a credential identifier that uniquely identifies the credentials of a user. In some examples, the credential identifier may be represented as an identification number and the values shown in the second column 1104 may represent the credential type. A third column 1106 indicates user permissions associated with the credentials According to the example provided above, the individual user may be user 706, "John Smith," holding a position of "Chief Financial Officer" at "MicroStrategy Incorporated." As seen subsequently in FIG. 12, each credential and set of user permissions associated with each credential may have a second data structure associated with that credential that indicates specific permissions associated with the credential, as well as one or more conditions on the usage of the permission by the user.

The example data structure 1100 indicates a first record 1120 that defines a first credential record associated with a user. The first record indicates that the first credential is a driver's license credential. The first credential has associated user permissions that are, in this case, grouped as a "Class C Non-Commercial" permission. According to the example, the "Class C Non-Commercial" permission may include any number of related permissions, such as permissions to drive any two-axle vehicle, to drive at any time of the day, to drive with a particular number of persons in the same vehicle, etc. In practice, each of these permissions may be listed in the relevant row of column 1106 of data structure 1100, or may be defined by a group of permissions as shown here, where the permission "Class C Non-Commercial" may represent multiple related permissions. Record 1122 of data structure 1100 defines a credential identifier for a "MicroStrategy Badge," such as that held by user 706, "John Smith." The credential may be associated with a user permission "Chief Financial Officer," which may be a permission with related permissions, such as permission to "Approve Purchase Orders >$100,000" and permission to "Approve Purchase Orders <$100,000."

Record 1124 of data structure 1100 may define a credential associated with a non-profit foundation, such as non-profit foundation 110 shown in FIG. 1. The credential relating to the non-profit foundation may include permissions coincident with a Board of Trustees member of the non-profit foundation, in a similar manner as the MicroStrategy Badge may have permissions coincident with a "Chief Financial Officer" position, as shown in record 1122 of data structure 110. Record 1126 of data structure 1100 may define a credential for an apartment resident, such as the apartment key credential presented with respect to FIG. 1. The record 1126 may identify that the particular credential is for "XYZ Apartments" and that the credential has permissions associated with an individual user being a resident or tenant. For example, the user permissions associated with the record 1126 may include permissions to unlock doors to an apartment building, permissions to access different amenities associated with an apartment building, etc., where some of the permissions may be permissions that can be delegated to other users. For example, a resident of "XYZ Apartments" may delegate a permission to access a particular unit in which they live to a maintenance crew or friend, to enable the maintenance crew to access an apartment for repairs, or to enable the friend to access the unit, FIG. 12 provides an illustration of an example data structure 1200 for storing information relating to one or more permissions associated with a credential. The data structure 1200 maintains permission data for a particular credential, and the system may include a data structure 1200 for each of multiple credentials assigned to a particular user. As shown, the data structure 1200 presents multiple permissions associated with a credential held by a user, such as the credential for a "MicroStrategy Badge" associated with user 706 "John Smith." Data structure 1200 is associated with a record of the data structure 1100, such as the record 1122 of FIG. 11. While the data structure 1200 is shown here as a table data structure, in practice, any number of other data structures may be used to achieve a similar function. In addition, the data structure 1200 may include more information or less information than shown in FIG. 12, or may include different information than presented.

Data structure 1200 includes a first column 1202 for a user and/or credential identifier. Data structure 1200 further includes a second column 1204 for a user permission identifier. Data structure 1200 includes a third column 1206 identifying whether the permission has been delegated to the user by another user or the permission is a permission conferred on the user by virtue of possession of a particular credential. The data structure 1200 also includes a fourth column 1208 indicating location conditions placed on exercising the permission, and a fifth column 1210 indicating time conditions associated with exercising the permission. Column 1212 of data structure 1200 indicates whether the permission is a delegatable permission that can be delegated by the user to another user, and column 1214 indicates, where applicable, if the permission has been delegated by the user to another user and to whom. For any permission that has been delegated by the user to another user, data structure 1200 identifies at column 1216 any geographic conditions imposed upon exercising the delegated permission and at column 1218 any temporal conditions imposed upon exercising the delegated permission.

The data structure 1200 further includes one or more records 1220-1224 that indicate specific permissions associated with the credential. As shown in FIG. 12, for example, the data structure 1200 includes a first record 1220 for a permission to "Approve Purchases >$100,000," a second record 1222 for a permission to "Approve Purchases <$100,000," and a third record 1224 for a permission to "Sign Contracts."

As indicated in column 1202, example data structure 1200 relates to a credential for a "MicroStrategy Badge" held by a user such as user 706 "John Smith." The data structure 1200 indicates a first permission record 1220 that defines a permission to "Approve Purchases >$100,000." The example data structure 1200 indicates that the permission was not a delegated permission, and that the permission may only be used within 30 miles of Tyson's Corner, Va., between 9:00 AM and 5:00 PM on days Monday through Friday. The permission record 1220 also indicates that the permission is not a delegatable permission. Consequently, the entries identifying users to receive the delegated permission, as well as any location or time conditions associated with delegating the permission, are not applicable.

Data structure 1200 also includes permission record 1222 associated with a permission to "Approve Purchases <$100,000." As indicated, this permission was not a permission delegated to the user, and that the permission may only be used within 30 miles of Tyson's Corner, Va., between the times of 9:00 AM and 5:00 PM on days Monday through Friday. This permission is identified as a delegatable permission at column 1212. In addition, the entry at column 1214 indicates that the permission has been delegated to an accounting manager "Jane Doe." The data structure 1200 also indicates that the user to whom this permission has been delegated (i.e., Jane Doe) only may only use the permission from 5:00 PM to 7:00 PM on days Monday through Friday. In practice, a particular permission that has been delegated to multiple users may have different location, time, and/or other conditions associated with the different users to whom the permission is delegated.

Record 1224 of data structure 1200 provides a permission to "Sign Contracts" that has been delegated to the user by another user. For example, a user, such as user 706 "John Smith," holding a position of "Chief Financial Officer" may have been delegated the permission to "Sign Contracts" by another user, such as a user holding a position of "Chief Executive Officer" or "Chief Operating Officer." The permission is associated with a location condition that allows the permission to be exercised only within 30 miles of Tyson's Corner, Va., and the permission may only be available to the user from the time the user is delegated the permission until Jan. 1, 2013 at 5:00 PM. Additionally, according to record 1224, the permission is a delegatable permission that has been delegated to a user holding the position of "Chief Operating Officer," named "Joe Boggs." The delegated permission to "Sign Contracts" has been assigned a location condition that enables the delegee to only exercise the permission when located within 30 miles of Tyson's Corner, and the permission has been assigned a time condition that only enables the delegee to use the permission before Jan. 1, 2014 at 5:00 PM.

Figure 13:
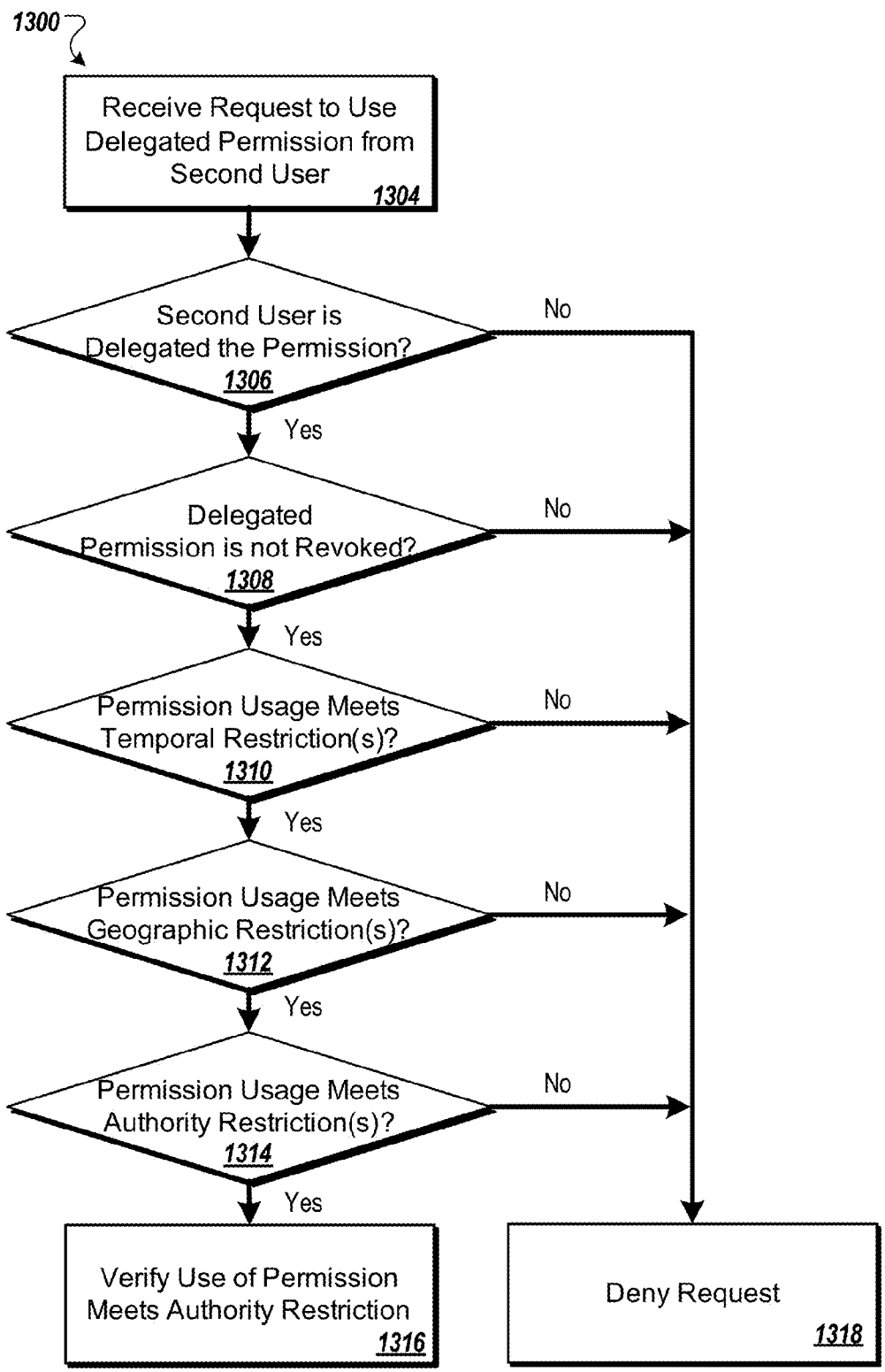
FIG. 13 is a flowchart of an example process for enabling a user to utilize a delegated permission.

FIG. 13 illustrates an example process 1300 for a second user to exercise a permission that has been delegated to the second user. The system receives a request from the second user to exercise a delegated permission (1304). In some instances, the request may be performed at a client device associated with the second user, and may be received by the system at a server responsible for the management, delegation, and validation of permissions. For example, a request may be received at a server from a client device associated with a second user "Jane Doe" to use a permission to approve a purchase order of less than $100,000, the permission to "Approve Purchase Orders <$100,000" being a delegated permission associated with a credential held by the second user.

The system verifies that the particular permission has been delegated to the second user (1306). In some instances, the system may access a credential associated with the user account corresponding to the second user, and may determine that the credential is associated with the delegated permission. For example, the server may determine if a credential associated with the second user is associated with a permission to approve purchase orders of less than $100,000, in response to receiving the request from the client device associated with the second user to exercise the permission to "Approve Purchase Orders <$100,000." If the system determines that the credential associated with the second user is associated with the requested permission, the process proceeds ("Yes"), otherwise, the process stops ("No"), where the request is denied (1318).

The system determines whether the delegated permission has been revoked, for example, by the first user who initially delegated the permission to the second user, by a credential granting authority, or by any other source (1308). For example, in some instances, a system may revoke a user's authority to exercise a delegated permission if the user attempts to exercise the permission a certain number of times when the conditions associated with exercising the condition are not met. Similarly, the system may revoke a user's authority to exercise a delegated permission if the user enters a validation mechanism for the permission above a threshold number of times. The system determines whether the permission delegated to a second user "Jane Doe" to "Approve Purchase Orders <$100,000" has been revoked. If the delegated permission has not been revoked, then the process proceeds ("Yes"), otherwise, the process ends ("No"), where the request is denied (1318).

The system verifies that the second user's request to exercise the delegated permission satisfies any temporal conditions applied to exercising the delegated permission. In some instances, the system may determine a current time, day, and/or date, and may determine whether the current time, day, and/or date satisfies any temporal conditions associated with exercising the delegated permission. For example, a permission to "Approve Purchase Orders <$100,000" delegated to a second user "Jane Doe" may be valid for use only for 48 hours after the permission has been delegated by the first user "John Smith." The system may determine a current time and date and may compare the current time and date to the time and date when the permission was delegated by the first user "John Smith" to the second user "Jane Doe." If the system determines that all temporal conditions associated with exercising the delegated permission are satisfied, the process proceeds ("Yes"), otherwise, the process ends ("No"), where the request is denied (1318).

The system verifies that the second user's request to exercise the delegated permission satisfies any geographic conditions applied to exercising the delegated permission (1312). In some instances, the system may determine a current location of a client device associated with the second user and may determine whether the current location of the client device satisfies the one or more geographic conditions. For example, a permission delegated to a second user "Jane Doe" to "Approve Purchase Orders <$100,000" may be valid when the client device associated with the second user is within 30 miles of Tyson's Corner, Va. The client device associated with the second user may detect a location of the client device at the time of the request to exercise the delegated permission and may submit the geographic location information for evaluation of the geographic condition associated with the delegated permission. For example, the client device associated with the second user "Jane Doe" may submit location information to a server, where the server may determine whether the client device is located within 30 miles of Tyson's Corner, Va. If the geographic conditions associated with the delegated permission are satisfied, then the process may proceed ("Yes"), while the process ends if the geographic condition is not met ("No") where the request is denied (318).

The system determines if the request to exercise a delegated permission satisfies one or more authority restrictions associated with the delegated permission (1314). In some instances, authority restrictions may require that a user hold a certain position within a company to be able to use a delegated permission, may require other co-requisite or prerequisite permissions to utilize a particular permission, or may have other authority restrictions. The system may access information associated with the second user to determine if the one or more authority conditions are satisfied, such as information in a user profile associated with the second user, or information associated with a credential held by the second user. For example, a permission delegated to a second user "Jane Doe" to "Approve Purchase Orders <$100,000" may only be a valid permission if the user associated with the permission has a certain title within the company, for example, if the user is associated with the accounting division of "MicroStrategy Incorporated." The system may determine information included in the user account associated with the second user "Jane Doe," and may determine that the second user has a title of "Accounting Manager" and is thus associated with the accounting division of "MicroStrategy Incorporated." If the one or more authority restrictions associated with a delegated permission are satisfied, the process 1300 proceeds, where the system verifies that the request to use the delegated permission is allowable and processes the request (1316). Otherwise, the system proceeds, where the request to use the permission is denied (1318).

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. A computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer implemented method comprising:
receiving, at a computer system and from a client device of a first user, data indicating that the first user has chosen to delegate, to a second user, a particular permission from amongst one or more permissions that are associated with a credential held by the first user, the particular permission being delegatable by the first user to one or more other users and being needed to perform a particular type of action;
based on the data indicating that the first user has chosen to delegate the particular permission to the second user, associating, at the computer system, the particular permission with a credential held by the second user;
receiving, at the computer system and from a device of a third user that is configured to permit a user to perform the particular type of action, data corresponding to a request to perform the particular type of action, wherein the data corresponding to the request comprises information identifying the credential held by the second user that is obtained by the device of the third user from a client device of the second user;
determining, at the computer system and based on the data corresponding to the request received from the device of the third user that is configured to permit a user to perform the particular type of action, that the credential held by the second user is associated with the particular permission delegated to the second user by the first user; and
transmitting, by the computer system to the device of the third user that is configured to permit a user to perform the particular type of action, data instructing the device of the third user to enable the second user to perform the particular type of action based on determining that the credential held by the second user is associated with the particular permission delegated to the second user by the first user.

2. The method of claim 1, wherein receiving the data indicating that the first user has chosen to delegate, to the second user, the particular permission from amongst the one or more permissions that are associated with the credential held by the first user comprises:
receiving, at the computer system and from the client device of the first user, input selecting the particular permission from amongst the one or more permissions that are associated with the credential held by the first user; and
receiving, at the computer system and from the client device of the first user, input selecting the second user to whom to delegate the particular permission.

3. The method of claim 1, comprising transmitting, to the client device of the second user, an indication of the delegation of the particular permission from the first user.

4. The method of claim 1:
wherein receiving the data indicating that the first user has chosen to delegate, to the second user, the particular permission from amongst the one or more permissions that are associated with the credential held by the first user comprises receiving, at the computer system and from the client device of the second user, a digital file that was electronically signed by the first user and that indicates that the first user chose to delegate the particular permission to the second user by providing the digital file to the client device of the second user; and wherein associating the particular permission with the credential held by the second user comprises:

confirming, at the computer system, that the electronic signature is a valid electronic signature for the first user;

verifying, at the computer system, that the first user is permitted to delegate the particular permission to the second user; and associating, at the computer system, the particular permission with the credential held by the second user based on the confirmation that the electronic signature is a valid electronic signature for the first user and the verification that the first user is permitted to delegate the particular permission to the second user.

5. The method of claim 1:

wherein receiving the data indicating that the first user has chosen to delegate, to the second user, the particular permission from among the one or more permissions that are associated with the credential held by the first user comprises receiving, at the computer system and from the client device of the first user, data indicating that the first user has chosen to delegate, to a plurality of other users that include the second user, the particular permission from among the one or more permissions that are associated with the credential held by the first user; and wherein associating the particular permission with the credential held by the second user comprises associating the particular permission with credentials held by each of the plurality of other users that include the credential held by the second user.

6. The method of claim 1, wherein associating the particular permission with the credential held by the second user comprises generating, at the computer system, a new credential for the second user and associating the particular permission with the new credential generated for the second user.

7. The method of claim 1, wherein the one or more permissions that are associated with the credential held by the first user comprise at least one non-delegatable permission associated with the credential held by the first user that the first user is not able to delegate to another user, the method further comprising:

preventing the first user from delegating the at least one non-delegatable permission to another user.

8. The method of claim 1, further comprising providing a notification to the client device of the first user notifying the first user that the second user has performed the particular type of action using the particular permission delegated to the second user by the first user.

9. The method of claim 1, further comprising, based on the data indicating that the first user has chosen to delegate, to the second user, the particular permission from amongst the one or more permissions that are associated with the credential held by the first user, preventing the first user from performing the particular type of action until the particular permission is disassociated with the credential held by the second user such that the second user is prevented from performing the particular type of action.

10. The method of claim 1, wherein the particular type of action is one of electronically signing a document on behalf of the first user, enabling access by the second user to accessing a physical or logical resource, or performing a financial transaction.

11. The method of claim 1:

wherein the particular permission is associated with one or more conditions that limit how the first user is able to delegate the particular permission; and wherein associating the particular permission with the credential held by the second user comprises:

accessing the one or more conditions that limit how the first user is able to delegate the particular permission, evaluating the one or more conditions that limit how the first user is able to delegate the particular permission, based on the evaluation, determining that the first user is permitted to delegate the particular permission to the second user, and based on the determination that the first user is permitted to delegate the particular permission to the second user, associating the particular permission with the credential held by the second user.

12. The method of claim 11, wherein the particular permission is granted to the first user by a credential granting authority, further comprising:

receiving, from the credential granting authority, the one or more conditions that limit how the first user is able to delegate the particular permission; and storing, in association with the particular permission, the one or more conditions that limit how the first user is able to delegate the particular permission received from the credential granting authority.

13. The method of claim 11:

wherein accessing the one or more conditions that limit how the first user is able to delegate the particular permission comprises:

accessing at least one user condition that defines users to whom the first user is able to delegate the particular permission, accessing at least one timing delegation condition that defines times when the first user is able to delegate the particular permission, accessing at least one timing usage condition that defines times when the first user is allowed to authorize usage of the particular permission upon delegation, accessing at least one geographic delegation condition that defines one or more locations where the first user must be located to delegate the particular permission, accessing at least one geographic usage condition that defines one or more locations where the first user is allowed to authorize usage of the particular permission upon delegation, and accessing at least one action condition that defines, from among actions that the particular permission enables, one or more actions that the first user is allowed to authorize performance of upon delegation;

wherein evaluating the one or more conditions that limit how the first user is able to delegate the particular permission comprises evaluating the at least one user condition, the at least one timing delegation condition, the at least one timing usage condition, the at least one geographic delegation condition, the at least one geographic usage condition, and the at least one action condition; and wherein determining that the first user is permitted to delegate the particular permission to the second user comprises determining that the evaluation of the at least one user condition, the at least one timing delegation condition, the at least one timing usage condition, the at least one geographic delegation condition, the at least one geographic usage condition, and the at least one action condition permit the first user to delegate the particular permission to the second user.

14. The method of claim 1:
wherein receiving the data indicating that the first user has chosen to delegate, to the second user, the particular permission from among the one or more permissions that are associated with the credential held by the first user comprises receiving, at the computer system and from the client device of the first user, data indicating that the first user has chosen to delegate, to the second user, the particular permission from among the one or more permissions that are associated with the credential held by the first user with one or more restrictions placed on usage of the particular permission by the second user;
wherein associating the particular permission with the credential held by the second user comprises associating, at the computer system, the delegation of the particular permission with the credential held by the second user with the one or more restrictions placed on usage of the particular permission by the second user; and
wherein determining that the credential held by the second user is associated with the particular permission delegated to the second user by the first user comprises:
determining, at the computer system and based on the data corresponding to the request received from the device of the third user that is configured to permit a user to perform the particular type of action, that the credential held by the second user is associated with the particular permission with the one or more restrictions placed on usage of the particular permission by the second user, and
determining, at the computer system, that the request to perform the particular type of action complies with the one or more restrictions placed on usage of the particular permission by the second user,
wherein transmitting the data instructing the device of the third user to enable the second user to perform the particular type of action based on determining that the credential held by the second user is associated with the particular permission delegated to the second user by the first user comprises transmitting the data instructing the device of the third user to enable the second user to perform the particular type of action based on the determination that the request to perform the particular type of action complies with the one or more restrictions placed on usage of the particular permission by the second user.

15. The method of claim 14:
wherein receiving the data indicating that the first user has chosen to delegate, to the second user, the particular permission from among the one or more permissions that are associated with the credential held by the first user with the one or more restrictions placed on usage of the particular permission by the second user comprises receiving data indicating that the first user has chosen to delegate a subset of authority granted by the particular permission to the second user;
wherein associating, at the computer system, the particular permission with the credential held by the second user with the one or more restrictions placed on usage of the particular permission by the second user comprises associating, at the computer system, the subset of authority granted by the particular permission with the credential held by the second user;
wherein determining that the credential held by the second user is associated with the particular permission with the one or more restrictions placed on usage of the particular permission by the second user comprises determining that the credential held by the second user is associated with the subset of authority granted by the particular permission;
wherein determining that the request to perform the particular type of action complies with the one or more restrictions placed on usage of the particular permission by the second user comprises determining that the particular type of action falls within the subset of authority granted by the particular permission, and
wherein transmitting the data instructing the device of the third user to enable the second user to perform the particular type of action based on the determination that the request to perform the particular type of action complies with the one or more restrictions placed on usage of the particular permission by the second user comprises transmitting the data instructing the device of the third user to enable the second user to perform the particular type of action based on the determination that the particular type of action falls within the subset of authority granted by the particular permission.

16. The method of claim 14:
wherein receiving the data indicating that the first user has chosen to delegate, to the second user, the particular permission from among the one or more permissions that are associated with the credential held by the first user with the one or more restrictions placed on usage of the particular permission by the second user comprises:
receiving at least one timing restriction that defines times when the second user is allowed to use the particular permission upon delegation,
receiving at least one geographic restriction that defines one or more locations where the second user is allowed to use the particular permission upon delegation, and
receiving at least one action restriction that defines, from among actions that the particular permission enables, one or more actions that the first user is allowed to perform upon delegation;
wherein associating, at the computer system, the particular permission with the credential held by the second user with the one or more restrictions placed on usage of the particular permission by the second user comprises associating, at the computer system, the particular permission with the credential held by the second user with the at least one timing restriction, the at least one geographic restriction, and the at least one action restriction;
wherein determining that the credential held by the second user is associated with the particular permission with the one or more restrictions placed on usage of the particular permission by the second user comprises determining that the credential held by the second user is associated with the particular permission with the at least one timing restriction, the at least one geographic restriction, and the at least one action restriction;
wherein determining that the request to perform the particular type of action complies with the one or more restrictions placed on usage of the particular permission by the second user comprises determining that the request to perform the particular type of action complies with the at least one timing restriction, the at least one geographic restriction, and the at least one action restriction, and wherein transmitting the data instructing the device of the third user to enable the second user to perform the particular type of action based on the determination that the request to perform the particular type of action complies with the one or more restrictions placed on usage of the particular permission by the second user comprises transmitting data instructing the device of the third user to enable the second user to perform the particular type of action based on the determination that the request to perform the particular type of action complies with the at least one timing restriction, the at least one geographic restriction, and the at least one action restriction.

17. The method of claim 14:

wherein receiving the data indicating that the first user has chosen to delegate, to the second user, the particular permission from among the one or more permissions that are associated with the credential held by the first user with the one or more restrictions placed on usage of the particular permission by the second user comprises receiving data indicating at least one transfer restriction that restricts how the second user is able to delegate the particular permission to one or more other users; and wherein associating, at the computer system, the particular permission with the credential held by the second user with the one or more restrictions placed on usage of the particular permission by the second user comprises associating, at the computer system, the particular permission with the credential held by the second user with the at least one transfer restriction, the method further comprising:

controlling delegation of the particular permission to one or more other users by the second user in accordance with the at least one transfer restriction.

18. A system comprising:

one or more computers and one or more storage devices storing instructions that are operable, when executed by the one or more computers, to cause the one or more computers to perform operations comprising:

receiving, at a computer system and from a client device of a first user, data indicating that the first user has chosen to delegate, to a second user, a particular permission from amongst one or more permissions that are associated with a credential held by the first user, the particular permission being delegatable by the first user to one or more other users and being needed to perform a particular type of action;

based on the data that the first user has chosen to delegate the particular permission to the second user, associating, at the computer system, the particular permission with a credential held by the second user;

receiving, at the computer system and from a device of a third user that is configured to permit a user to perform the particular type of action, data corresponding to a request to perform the particular type of action, wherein the data corresponding to the request comprises information identifying the credential held by the second user that is obtained by the device of the third user from a client device of the second user;

determining, at the computer system and based on the data corresponding to the request received from the device of the third user that is configured to permit a user to perform the particular type of action, that the credential held by the second user is associated with the particular permission delegated to the second user by the first user; and transmitting, by the computer system to the device of the third user that is configured to permit a user to perform the particular type of action, data instructing the device of the third user to enable the second user to perform the particular type of action based on determining that the credential held by the second user is associated with the particular permission delegated to the second user by the first user.

19. A method comprising:

maintaining, at a computer system, a first credential held by a first user, the first credential held by the first user having been granted to the first user by a credential granting authority to indicate a first status of the first user with the credential granting authority and the first credential held by the first user being associated with one or more permissions bestowed by the credential granting authority on users having the first status with the credential granting authority;

transmitting, by the computer system to a client device of the first user, credential data that enables the client device to display the first credential held by the first user and to display the one or more permissions associated with the first credential held by the first user with an indication of which of the one or more permissions the first user is able to delegate to another user;

receiving, by the computer system and from the client device of the first user, data indicating that the first user has chosen to delegate, to another user, a particular permission from among the one or more permissions the first user is able to delegate to another user, the particular permission being needed to perform a particular type of action;

transmitting, by the computer system to the client device of the first user, permission data indicating one or more other users to whom the first user is able to delegate the particular permission, the permission data enabling the client device of the first user to display the one or more other users to whom the first user is able to delegate the particular permission;

receiving, by the computer system and from the client device of the first user, data indicating a selection, of a second user to whom the first user would like to delegate the particular permission, from among the one or more other users to whom the first user is able to delegate the particular permission;

based on the data indicating the selection of the second user to whom the first user would like to delegate the particular permission, associating, at the computer system, the particular permission with a second credential held by the second user, the second credential held by the second user having been granted to the second user by the credential granting authority to indicate a second status of the second user with the credential granting authority, wherein the second status of the second user is different than the first status of the first user, and wherein the credential granting authority does not bestow the particular permission on users having the second status with the credential granting authority;

receiving, by the computer system and from a device of a third user that is configured to permit a user to perform the particular type of action, data corresponding to a request to validate the second credential held by the second user in connection with an attempt to perform the particular type of action, wherein the data corresponding to the request comprises information identifying the second credential held by the second user that is obtained by the device of the third user from a client device of the second user;

determining, by the computer system and based on the data corresponding to the request, that the second credential held by the second user is associated with the particular permission; and validating, by the computer system, the second credential held by the second user in connection with the attempt to perform the particular type of action based on the determination that the second credential held by the second user is associated with the particular permission.

\* \* \* \* \*